(12) United States Patent
Mohamed

(10) Patent No.: US 10,995,866 B2
(45) Date of Patent: May 4, 2021

(54) STACKED VALVE ASSEMBLY

(71) Applicant: Zahroof Valves Inc., Houston, TX (US)

(72) Inventor: Zahroof Mohamed, Cypress, TX (US)

(73) Assignee: ZAHROOF VALVES INC., Houston, TX (US)

(*) Notice: Subject to any disclaimer, the term of this patent is extended or adjusted under 35 U.S.C. 154(b) by 133 days.

(21) Appl. No.: 16/022,213

(22) Filed: Jun. 28, 2018

(65) Prior Publication Data
US 2019/0003604 A1   Jan. 3, 2019

Related U.S. Application Data
(60) Provisional application No. 62/527,887, filed on Jun. 30, 2017.

(51) Int. Cl.
*F16K 27/02* (2006.01)
*F16K 15/16* (2006.01)
(Continued)

(52) U.S. Cl.
CPC .......... *F16K 15/08* (2013.01); *F04B 39/1026* (2013.01); *F04B 39/1033* (2013.01);
(Continued)

(58) Field of Classification Search
CPC ...... F16K 15/08; F16K 15/16; F16K 27/0209; F04B 39/1026; F04B 39/1033;
(Continued)

(56) References Cited

U.S. PATENT DOCUMENTS

| 156,769 | A | * | 11/1874 | Cameron | F04B 39/1033 |
| | | | | | 137/512 |
| RE12,094 | E | * | 3/1903 | Klein | 137/512.1 |

(Continued)

FOREIGN PATENT DOCUMENTS

| CH | 255795 A | 7/1948 |
| CN | 35201501 U | 1/1986 |

(Continued)

OTHER PUBLICATIONS

International Search Report and Written Opinion from PCT/US2018/040311 dated Sep. 24, 2018.
(Continued)

*Primary Examiner* — Kevin F Murphy
*Assistant Examiner* — Jonathan J Waddy
(74) *Attorney, Agent, or Firm* — Jonathan Pierce; Pierre Campanac; Porter Hedges LLP

(57) ABSTRACT

A valve assembly includes a seat plate having a top surface and a bottom surface, a plurality of first valve modules arranged in a first level relative to the seat plate such that a first seating face of each of the plurality of first valve modules is substantially co-planar with a first plane that is substantially parallel to at least one of the top surface and the bottom surface of the seat plate, and at least one second valve module arranged in a second level relative to the seat plate such that a second seating face of the at least one second valve module is co-planar with a second plane that is substantially parallel to the first plane, wherein the second plane is offset from the first plane by a first distance.

15 Claims, 23 Drawing Sheets

(51) Int. Cl.
*F04B 39/10* (2006.01)
*F16K 15/08* (2006.01)
*F16K 27/00* (2006.01)

(52) U.S. Cl.
CPC ...... *F04B 39/1066* (2013.01); *F04B 39/1073* (2013.01); *F16K 15/16* (2013.01); *F16K 27/003* (2013.01); *F16K 27/0209* (2013.01); *Y10T 137/7839* (2015.04)

(58) Field of Classification Search
CPC ............... F04B 39/1053; F04B 39/106; F04B 39/1066; F04B 39/1073; F04B 39/108; F04B 39/1086; Y10T 137/7839
USPC ........................................................ 137/512.1
See application file for complete search history.

(56) References Cited

U.S. PATENT DOCUMENTS

| | | | |
|---|---|---|---|
| 1,022,157 A | 4/1912 | Scott | |
| 1,114,303 A * | 10/1914 | Snow et al. | F04B 39/1033 137/454.4 |
| 1,181,347 A * | 5/1916 | Reader | F04B 53/109 417/567 |
| 1,492,019 A * | 4/1924 | Colony | B01F 5/0681 366/176.4 |
| 1,599,414 A | 9/1926 | Huff | |
| 1,632,155 A | 6/1927 | Vollmann | |
| 1,659,812 A * | 2/1928 | Ferguson | F04B 39/1073 417/537 |
| 1,754,747 A | 4/1930 | Feldbush | |
| 1,799,103 A | 3/1931 | Klimek | |
| 1,808,495 A * | 6/1931 | Daddysman | F16K 15/08 137/543.15 |
| 2,199,307 A | 4/1940 | Eichelberg | |
| 2,408,056 A | 9/1946 | Farmer | |
| 2,505,757 A | 5/1950 | Dunbar et al. | |
| 2,693,818 A * | 11/1954 | Tucker | F16K 15/02 137/454.4 |
| 2,718,900 A * | 9/1955 | Nutter | B01D 3/163 137/512.1 |
| 2,781,777 A | 2/1957 | Oxnam | |
| 2,934,083 A | 4/1960 | Norton | |
| 3,286,728 A | 11/1966 | Stephenson | |
| 3,395,858 A | 8/1968 | Spencer et al. | |
| 3,412,754 A | 11/1968 | Schou et al. | |
| 3,442,290 A * | 5/1969 | Phillips | F15B 13/042 137/596.2 |
| 3,556,136 A | 1/1971 | White | |
| 3,602,247 A * | 8/1971 | Bunn | F04B 39/1013 137/270 |
| 3,703,912 A | 11/1972 | Bauer et al. | |
| 3,905,340 A | 9/1975 | Boyesen | |
| 3,905,341 A | 9/1975 | Boyesen | |
| 4,036,251 A | 7/1977 | Hartwick et al. | |
| 4,051,820 A | 10/1977 | Boyesen | |
| 4,058,138 A | 11/1977 | Viktorov et al. | |
| 4,168,722 A | 9/1979 | Mayer et al. | |
| 4,172,696 A | 10/1979 | Gyory | |
| 4,173,985 A | 11/1979 | Kirpichenkov | |
| 4,195,660 A | 4/1980 | Taipale et al. | |
| 4,290,455 A | 9/1981 | Honda et al. | |
| 4,294,202 A | 10/1981 | Boyesen | |
| 4,483,363 A | 11/1984 | Madoche et al. | |
| 4,607,660 A * | 8/1986 | Bennitt | F16K 15/023 137/512.1 |
| 4,633,825 A | 1/1987 | Flaig | |
| 4,643,139 A | 2/1987 | Hargreaves | |
| 4,819,689 A | 4/1989 | Owsley et al. | |
| 4,854,341 A | 8/1989 | Bauer | |
| 4,872,481 A | 10/1989 | Shaw et al. | |
| 4,879,976 A | 11/1989 | Boyesen | |
| 4,924,906 A | 5/1990 | Hrabal | |
| 4,934,362 A | 6/1990 | Braun | |
| 5,027,754 A | 7/1991 | Morone | |
| 5,103,867 A | 4/1992 | Wu | |
| 5,245,956 A | 9/1993 | Martin | |
| 5,364,244 A | 11/1994 | Taylor-McCune et al. | |
| 5,390,699 A | 2/1995 | Yamada | |
| 5,454,397 A | 10/1995 | Miszczak | |
| 5,672,053 A | 9/1997 | Sabha | |
| 6,394,128 B1 | 5/2002 | Concialdi | |
| 6,880,577 B2 | 4/2005 | Tassinari et al. | |
| 7,028,649 B1 | 4/2006 | Hosaluk et al. | |
| 7,614,422 B2 | 11/2009 | Tassinari et al. | |
| 8,365,771 B2 | 2/2013 | Xue et al. | |
| 8,485,801 B2 | 7/2013 | Mohamed | |
| 2003/0019527 A1 | 1/2003 | Oppermann et al. | |
| 2007/0065321 A1 | 3/2007 | Durham | |
| 2008/0156381 A1 | 7/2008 | Tuymer | |
| 2008/0223459 A1 | 9/2008 | Walpole et al. | |
| 2009/0028733 A1 | 1/2009 | Duwel | |
| 2010/0040497 A1 | 2/2010 | Mohamed | |
| 2010/0090149 A1 | 4/2010 | Thompson et al. | |
| 2010/0108163 A1 | 5/2010 | Mohamed | |
| 2011/0139158 A1 | 6/2011 | Xue et al. | |
| 2012/0227847 A1 | 9/2012 | Mohamed | |

FOREIGN PATENT DOCUMENTS

| | | |
|---|---|---|
| DE | 1550470 A1 | 1/1970 |
| EP | 0426223 A1 | 5/1991 |
| GB | 496795 A | 12/1938 |
| GB | 583847 A | 1/1947 |
| GB | 2361290 A | 10/2001 |
| SU | 1002660 A1 | 3/1983 |
| WO | 2008091672 A1 | 7/2008 |
| WO | 2015166335 A2 | 11/2015 |

OTHER PUBLICATIONS

Certified Translation of German Patent DE1550470 previously submitted in IDS filed Oct. 22, 2018.

* cited by examiner

STACKED VALVE ASSEMBLY

BACKGROUND

1. Field of the Disclosure

Generally, the present disclosure relates to valve assemblies for controlling fluid flow, and, more specifically, to stacked valve assemblies having an improved effective flow area.

2. Description of the Related Art

Valves are commonly used in many different industrial applications to regulate, direct, or control the flow of fluids, such as gases and/or liquids and the like, by opening, closing, or partially obstructing a fluid flow passageway. Many valves are operated manually, i.e., by a human operator, or they may be operated electrically or hydraulically by actuators that are instructed by a system or operator to open or close the valve. Other valves are operated automatically, that is, without any specific system or operator interaction, when certain conditions exist. One such automatically operating valve is a compressor valve, which operates to open and close based upon differential pressures that exist upstream and downstream of the valve.

One type of compressor that is used for many industrial applications is a reciprocating compressor, which is a positive-displacement device that typically utilizes a crankshaft that is coupled to and reciprocally drives a piston to compress a fluid within an attached cylinder. In operation, gas is typically introduced into a compression chamber of the cylinder through one or more suction (inlet) valve assemblies and, following compression by the piston, the fluid exits the cylinder through one or more discharge (outlet) valve assemblies. Many different types of valve assemblies are commonly used in such reciprocating compressor applications, such as poppet valves, plate valves, ring valves, reed valves and the like.

Many efforts are made in the industry to improve the performance and efficiency of compressor valve assemblies. For example, typical plate valve assemblies—which are commonly used in many reciprocating compressor applications—often have an effective flow area that is in the range of approximately 10 to 16% of the area of the cylinder opening through which they regulate flow. Different valve design configurations have been used for many years in an attempt to increase this low effective flow area ratio, such as radial valves, double-decker valves, deck-and-a-half valves, radial valves, and the like. However, while such valves have met with some success in providing an increased effective flow area, these design configurations typically add a significant amount of clearance volume to the compressor—i.e., volume within the compressor where gas is trapped and cannot be swept out of the cylinder by the piston stroke—that reduces volumetric efficiency and increases heat in the cylinder due to the higher temperature of the trapped gas, which in turn mixes with and heats up the incoming gas and reduces overall operating efficiency.

Accordingly, there is need in the industry for new and improved valve assembly designs having increased overall operating efficiency and performance. The present disclosure is directed to novel and unique valve assembly configurations having increased effective flow area while avoiding, or at least reducing, the effects of the above identified problems associated with existing valve designs.

SUMMARY OF THE DISCLOSURE

The following presents a simplified summary of the disclosure in order to provide a basic understanding of some aspects of the subject matter that is described in further detail below. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the subject matter disclosed herein is directed to various new and unique valve assemblies for controlling fluid flow, and in particular to stacked valve assemblies having an improved effective flow area. In one illustrative embodiment, a valve assembly is disclosed that includes a seat plate having a top surface and a bottom surface, a plurality of first valve modules arranged in a first level relative to the seat plate such that a first seating face of each of the plurality of first valve modules is substantially co-planar with a first plane that is substantially parallel to at least one of the top surface and the bottom surface of the seat plate, and at least one second valve module arranged in a second level relative to the seat plate such that a second seating face of the at least one second valve module is co-planar with a second plane that is substantially parallel to the first plane, wherein the second plane is offset from the first plane by a first distance.

In another exemplary embodiment of the present disclosure, a method of arranging valve modules in a valve assembly includes, among other things, arranging a plurality of first valve modules in a first level within the valve assembly such that a first seating face of each of the plurality of first valve modules is substantially co-planar with a first plane that is substantially parallel to a seating surface of the valve assembly, and arranging a plurality of second valve modules within the valve assembly such that a second seating face of each of the second valve modules is co-planar with a second plane that is substantially parallel to the first plane, wherein the second plane is offset from the first plane by a first distance.

BRIEF DESCRIPTION OF THE DRAWINGS

The disclosure may be understood by reference to the following description taken in conjunction with the accompanying drawings, in which like reference numerals identify like elements, and in which.

Figure 1:
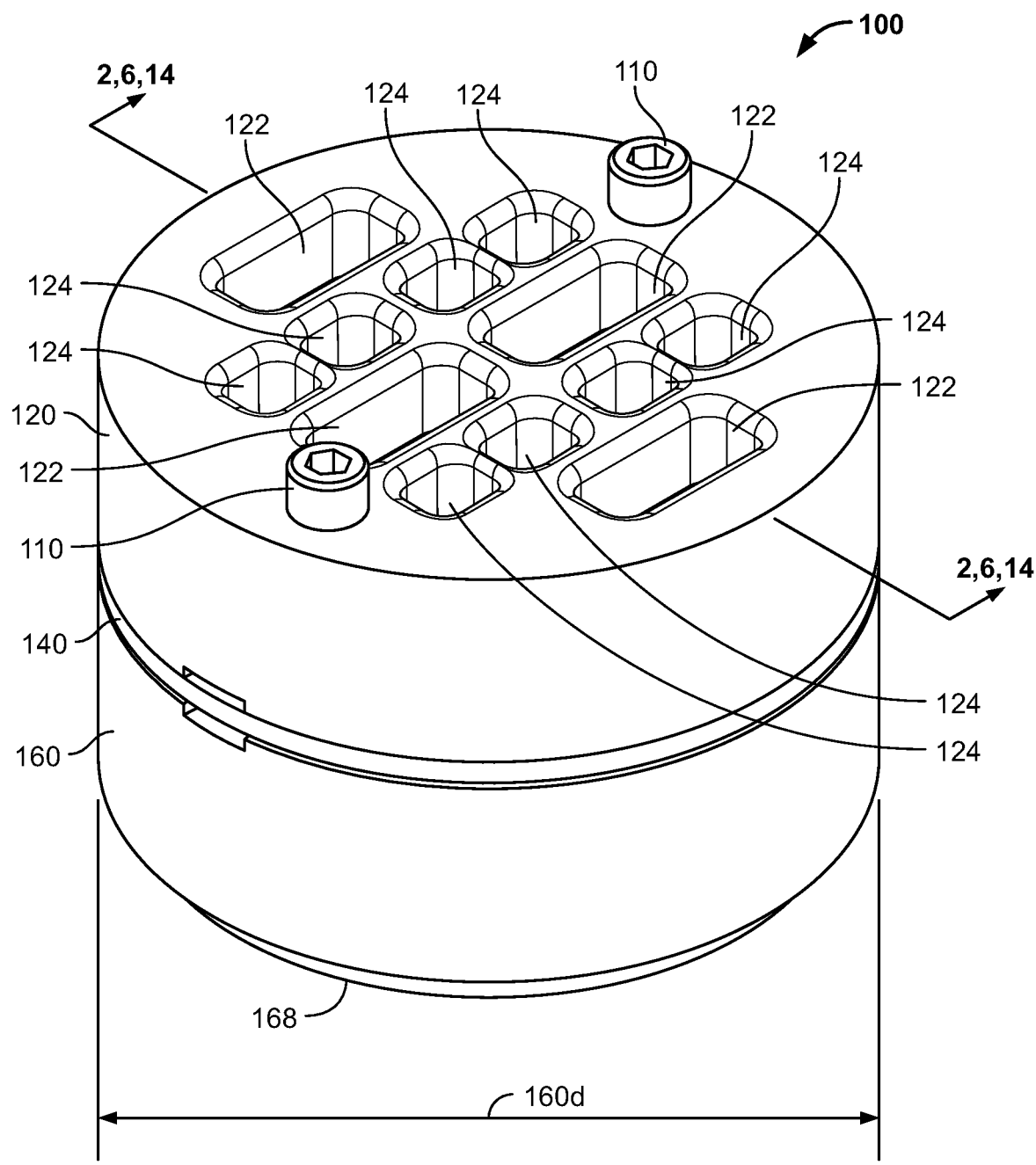
FIG. 1 is an isometric view of one exemplary embodiment of a stacked valve assembly in accordance with the present disclosure.
Figure 1A:
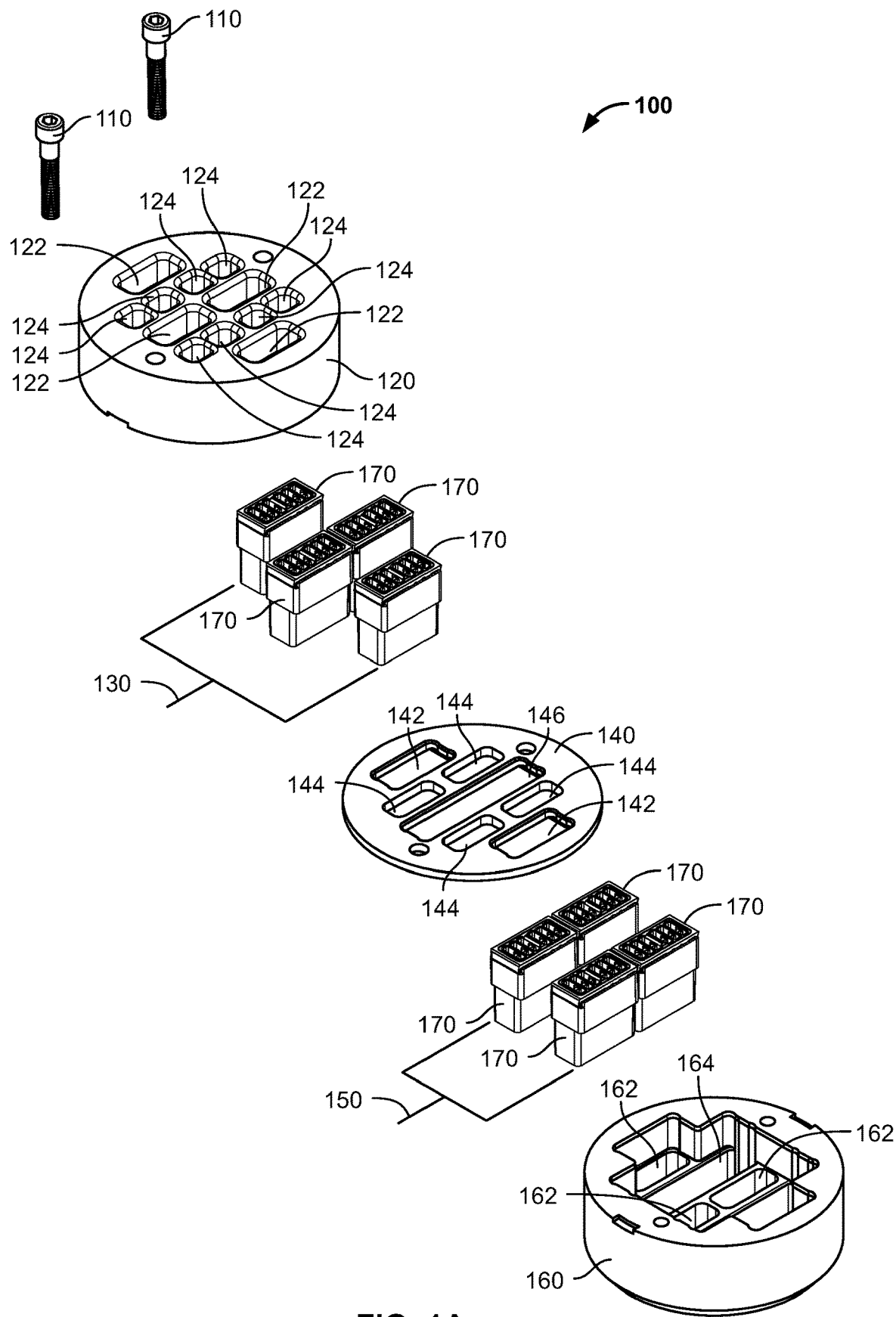
FIG. 1A is an exploded isometric view of the illustrative stacked valve assembly shown in FIG. 1.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the subject matter defined by the appended claims to the particular forms disclosed, but on the contrary, the intention is to cover all modifications, equivalents, and alternatives falling within the spirit and scope of the claimed subject matter.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. Furthermore, unless otherwise noted below, no special definition of a term or phrase, i.e., a definition that is different from the ordinary and customary meaning as understood by those skilled in the art, is intended to be implied by consistent usage of the term or phrase herein. Accordingly, to the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used in this description and in the appended claims, the terms "substantial" or "substantially" are intended to conform to the ordinary dictionary definition of that term, meaning "largely but not wholly that which is specified." As such, no geometrical or mathematical precision is intended by the use of terms such as "substantially flat," "substantially perpendicular," "substantially parallel," "substantially circular," "substantially elliptical," "substantially rectangular," "substantially square," "substantially aligned," and/or "substantially flush," and the like. Instead, the terms "substantial" or "substantially" are used in the sense that the described or claimed component or surface configuration, position, or orientation is intended to be manufactured, positioned, or oriented in such a configuration as a target. For example, the terms "substantial" or "substantially" should be interpreted to include components and surfaces that are manufactured, positioned, or oriented as close as is reasonably and customarily practicable within normally accepted tolerances for components of the type that are described and/or claimed. Furthermore, the use of phrases such as "substantially conform" or "substantially conforms" when describing the configuration or shape of a particular component or surface, such as by stating that "the configuration of the component substantially conforms to the configuration of a rectangular prism," should be interpreted in similar fashion.

Furthermore, unless otherwise specifically indicated, any relative positional or directional terms that may be used in the descriptions set forth below or in the appended claims—e.g., terms such as "upper," "lower," "above," "below," "over," "under," "top," "bottom," "vertical," "horizontal," and the like—have been included so as to provide additional clarity to the description or claims, and should be construed in light of that term's normal and everyday meaning relative to the depiction of the components or elements in the referenced figures. For example, referring to the cross-sectional views of the illustrative stacked valve assembly 100 shown in FIGS. 2 and 6, the seat plate 120 is depicted as being positioned "above" the intermediate seat plate 140, and the carrier plate 160 is shown as being positioned "below" both the intermediate seat plate 140 and the seat plate 120. Additionally, with respect to the front cross-sectional and exploded views of the stacked valve assembly 100 depicted in FIGS. 6 and 6A, an "upper" portion 172 of each of a first plurality of reed valve modules 170 in an "upper" row of reed valve modules is shown as being positioned within a cavity 126 in the seat plate 120, whereas part of a "lower" portion 174 of each of the first plurality of reed valve modules 170 in the "upper" row of reed valve modules 170 is positioned within an upper cavity region 163 in the carrier plate 160. However, it should be understood by those of ordinary skill after a complete reading of the present disclosure that simply reorienting the stacked valve assembly 100 to any position other than that shown in the figures—for example, by flipping the assembly 100 such that the carrier plate 160 is positioned above the seat plate 120, or by rotating the assembly 100 to any angle other than that depicted in the figures—does not change the actual relative positional relationships of the illustrated and described components, because the positional terms are generally used for convenience and understanding of the disclosed subject matter.

Generally, the subject matter disclosed herein is directed to various new and unique valve assemblies for controlling fluid flow, and in particular to stacked valve assemblies having an improved effective flow area. Furthermore, while reference is made in the description to the use of the illustrated embodiment as a suction valve for a reciprocating compressor, it should be understood by those of ordinary skill after a complete reading of the present disclosure that the described subject matter is not so limited, as the principals and configurations disclosed herein may readily be adapted for use as compressor valves, general check valves or non-return valves, etc., as may be used in a variety of applications, such as engines, pipelines, turbomachinery, and the like.

FIGS. 1-15 and FIGS. 17-24 are various isometric, elevation, and cross-sectional views that provide exemplary details of some illustrative aspects of the elements and components of a stacked valve assembly in accordance with the present disclosure. In particular, FIGS. 1-15 depict certain aspects of one illustrative embodiment of a stacked valve assembly 100 and FIGS. 17-24 depict certain aspects of another illustrative embodiment of a stacked valve assembly 200 having at least some details and elements in common with the stacked valve assembly 100 shown in FIGS. 1-15.

Figure 2:
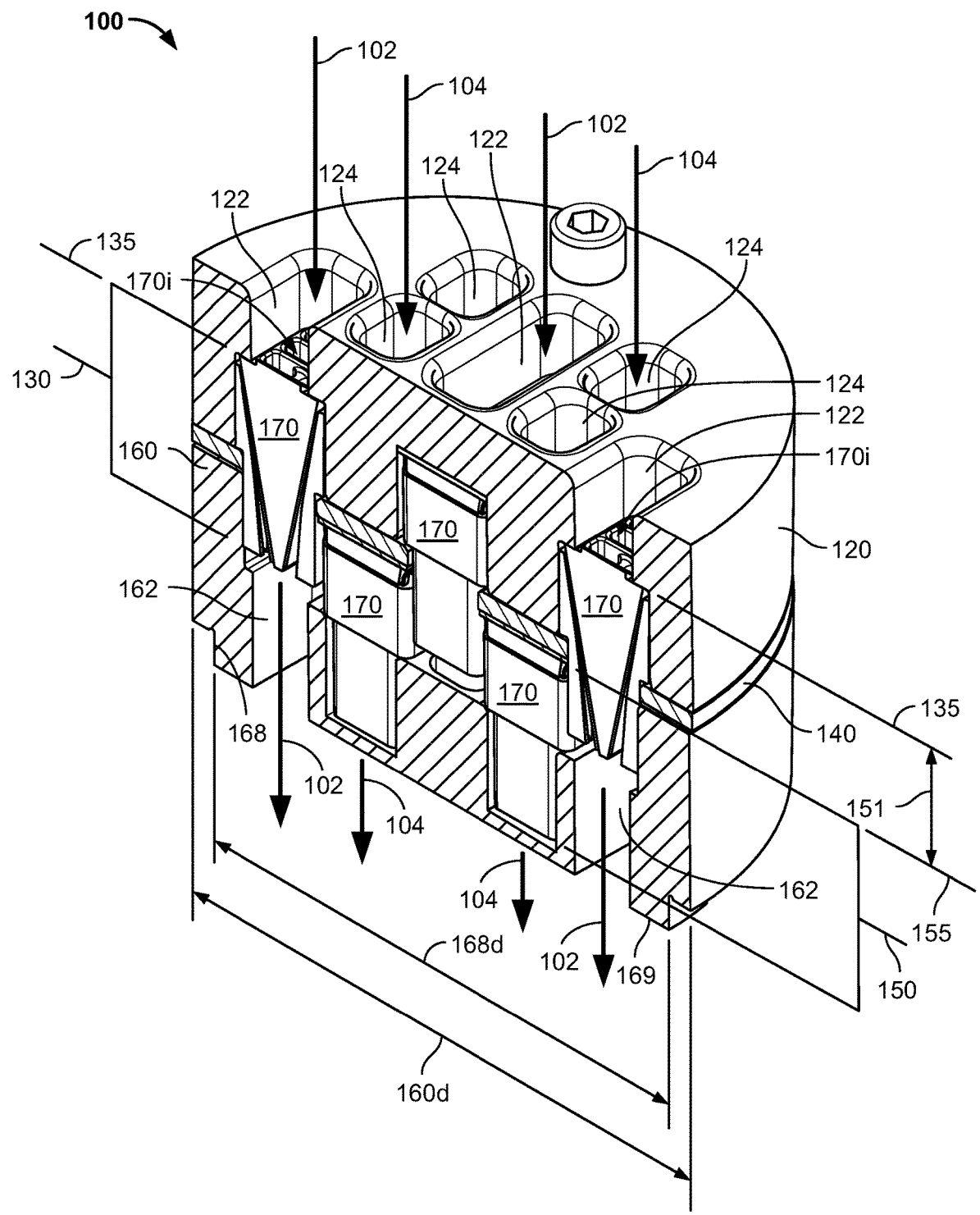
FIG. 2 is a cross-sectional isometric view of the stacked valve assembly depicted in FIG. 1 when viewed along the section line "2-2" of FIG. 1.
Figure 2A:
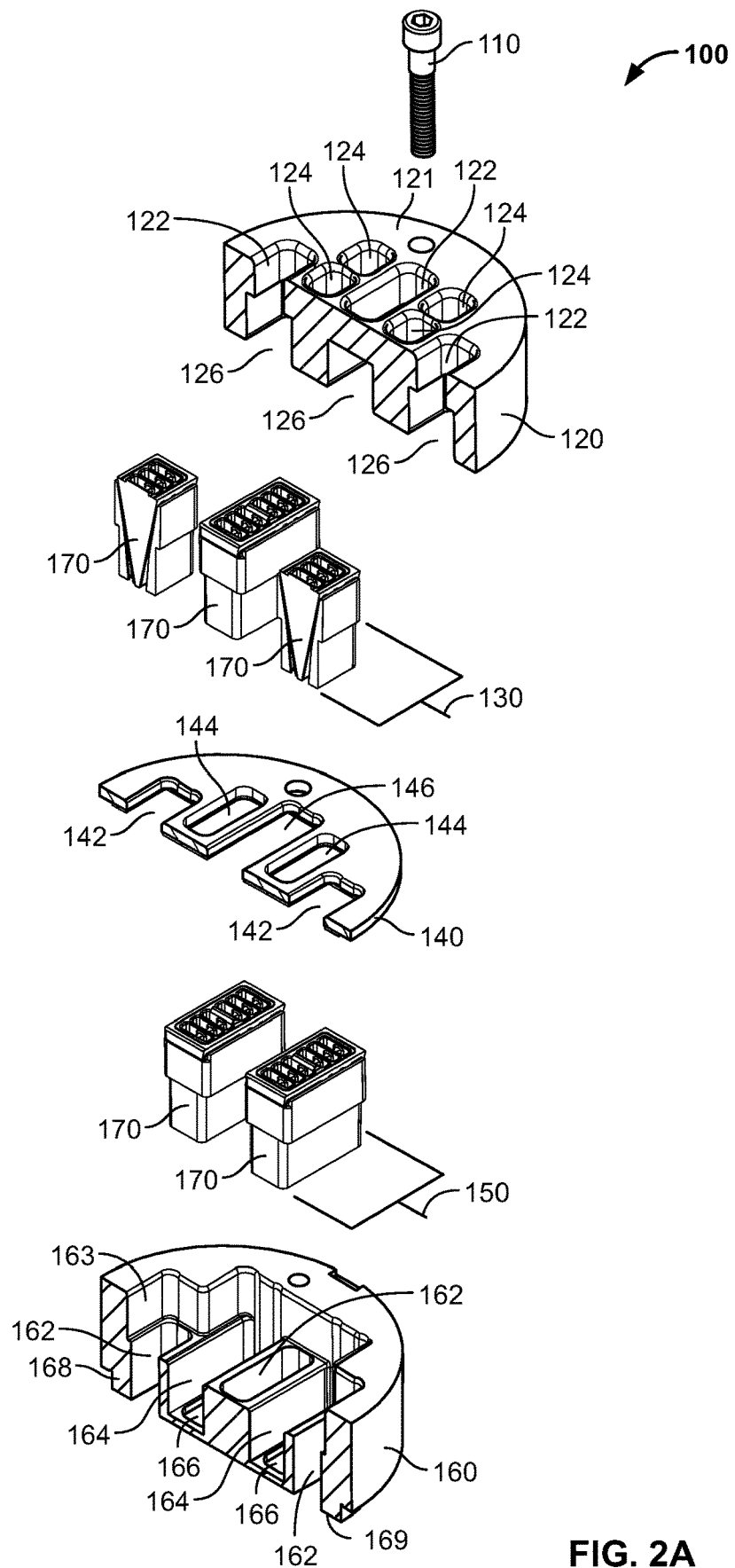
FIG. 2A is an exploded cross-sectional isometric view of the exemplary stacked valve assembly shown in FIG. 2.
Figure 3:
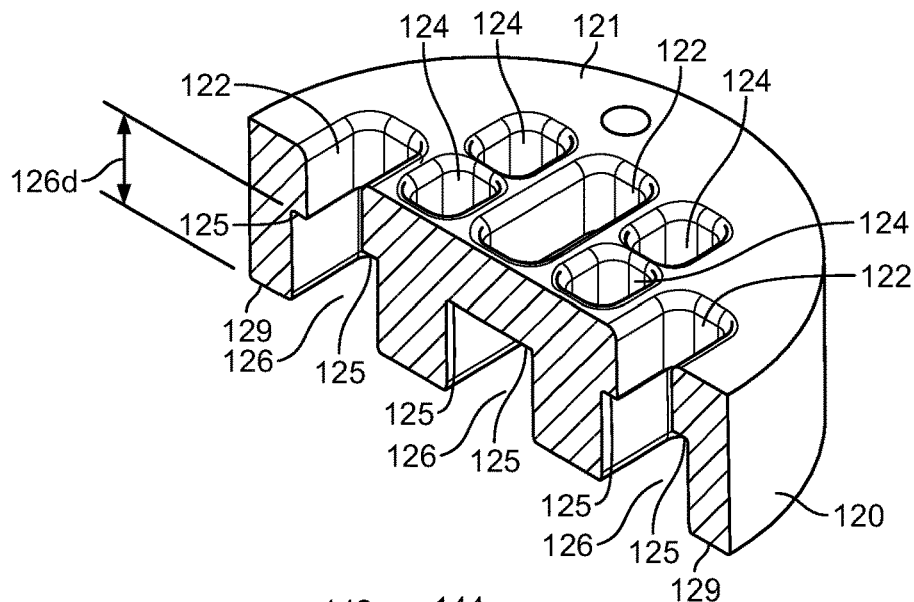
FIGS. 3-5 are close-up cross-sectional isometric views of various components of the illustrative stacked valve assembly shown in FIGS. 2 and 2A.
Figure 4:
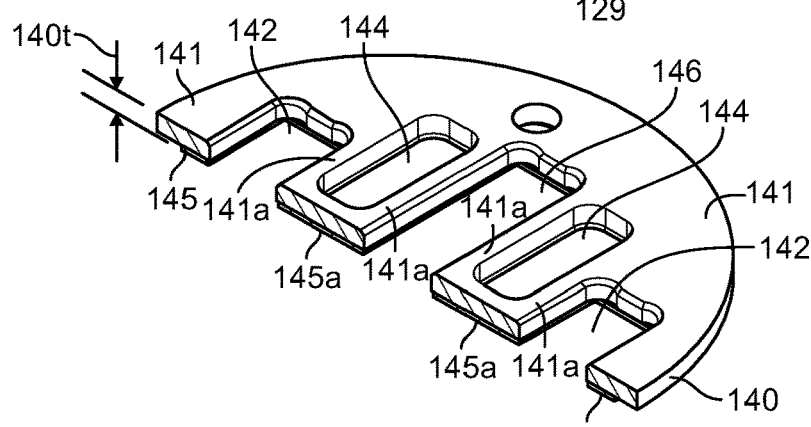
Figure 6:
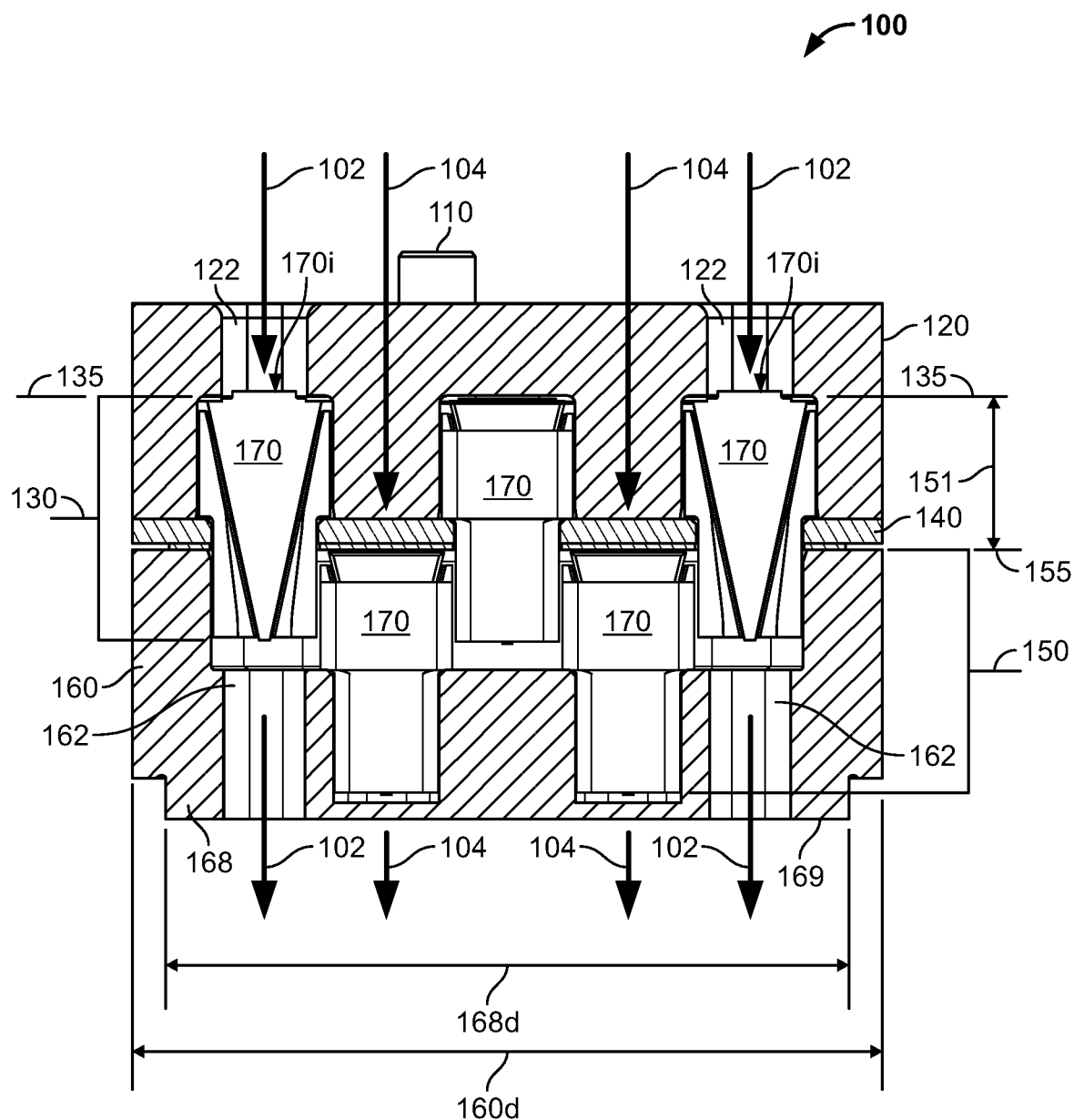
FIG. 6 is a cross-sectional front view of the stacked valve assembly depicted in FIG. 1 when viewed along the section line "6-6" of FIG. 1.
Figure 7:
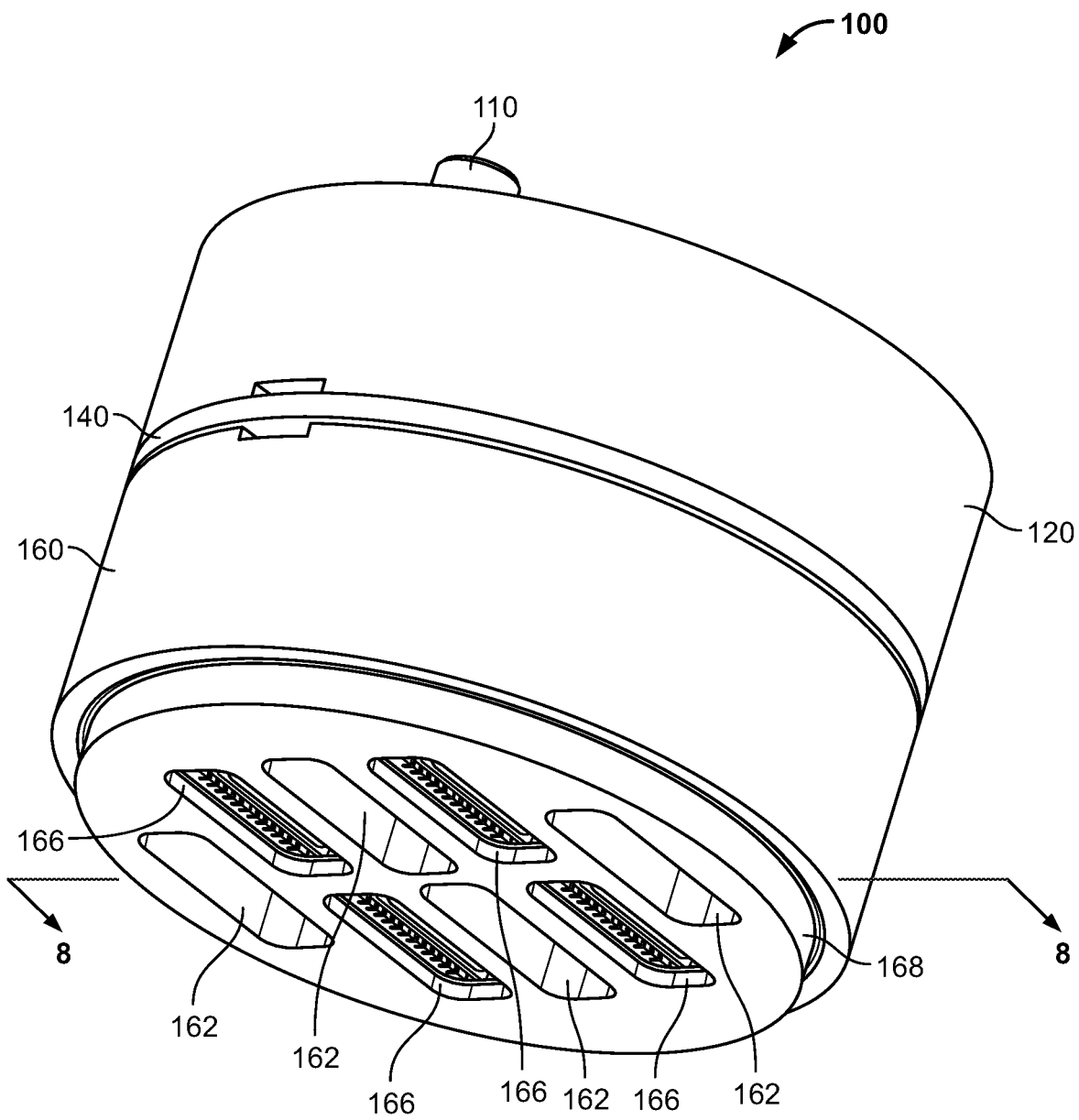
FIG. 7 is an isometric view of the illustrative stacked valve assembly shown in FIG. 1 when viewed from below.
Figure 8:
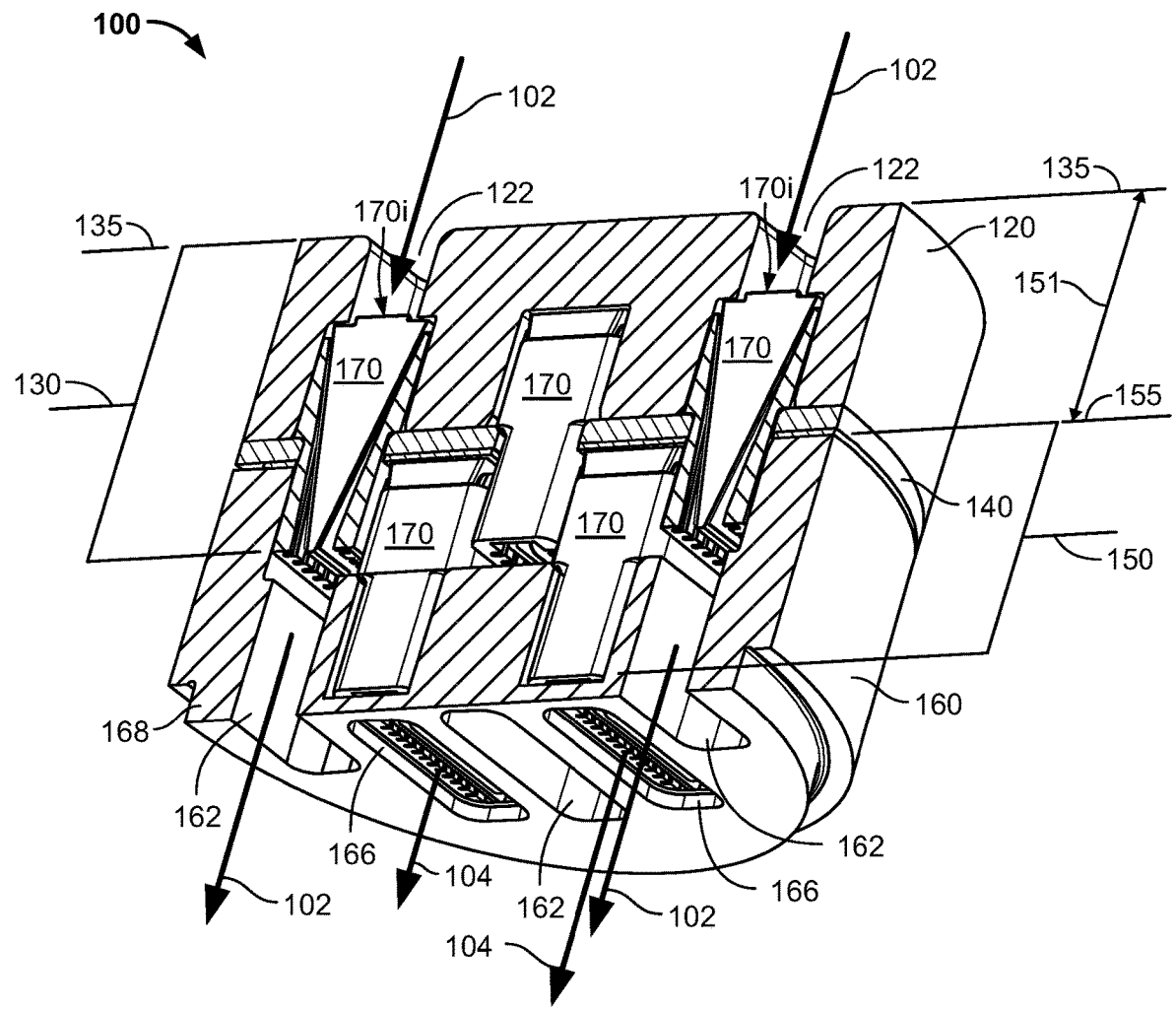
FIG. 8 is a cross-sectional isometric view of the stacked valve assembly depicted in FIG. 7 when viewed along the section line "8-8" of FIG. 7.
Figure 9:
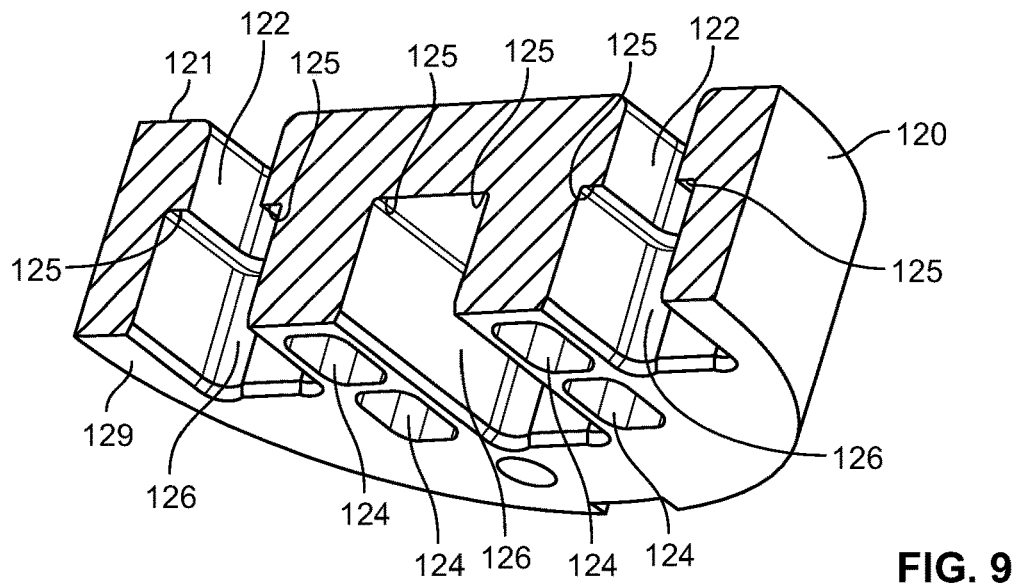
FIGS. 9-11 are close-up cross-sectional isometric views of various components of the illustrative stacked valve assembly shown in FIG. 8.
Figure 10:
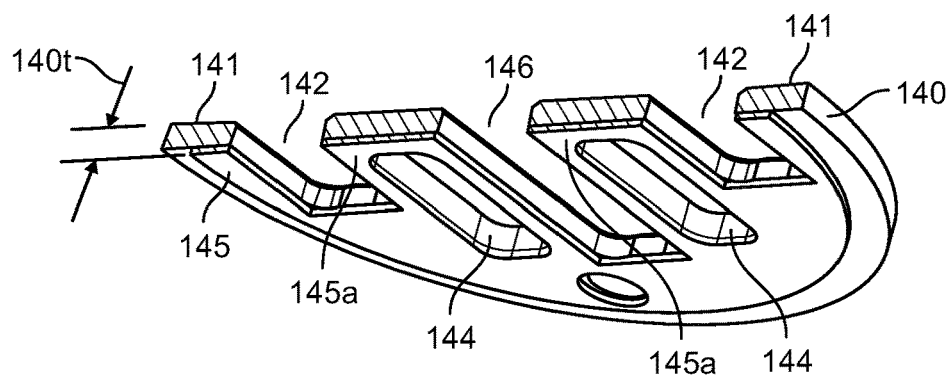
Figure 12:
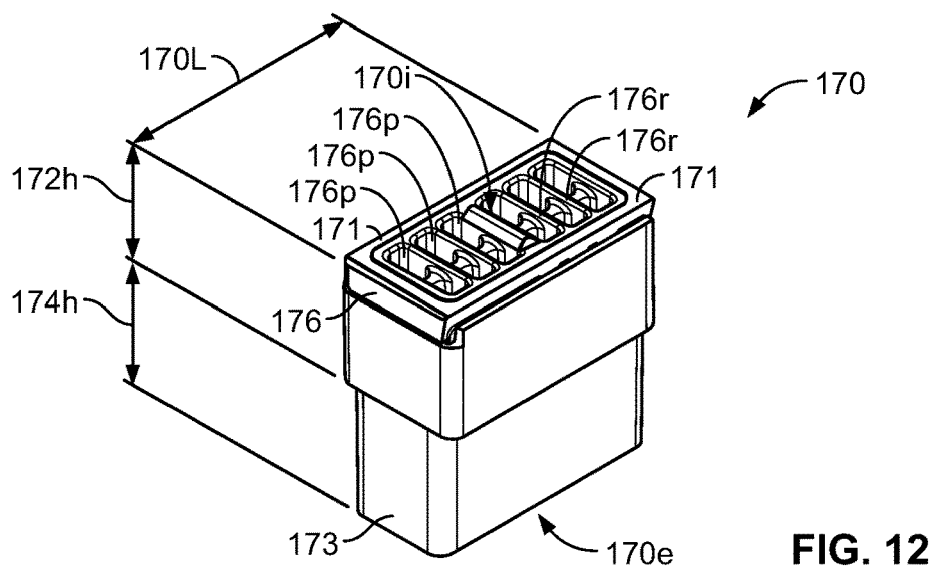
FIG. 12 is an isometric view of an exemplary reed valve module in accordance with the disclosed subject matter.
Figure 13A:
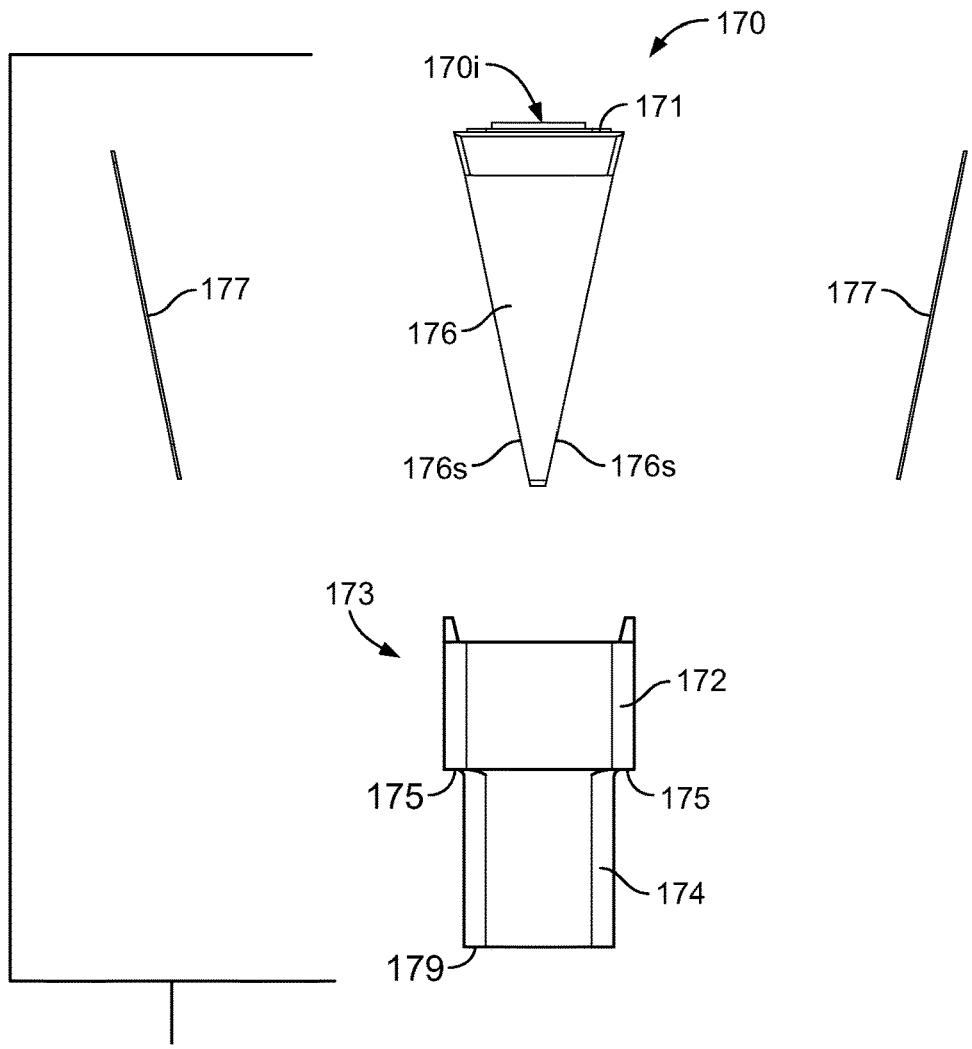
FIG. 13A is an exploded front view of the reed valve module shown in FIG. 13.
Figure 13:
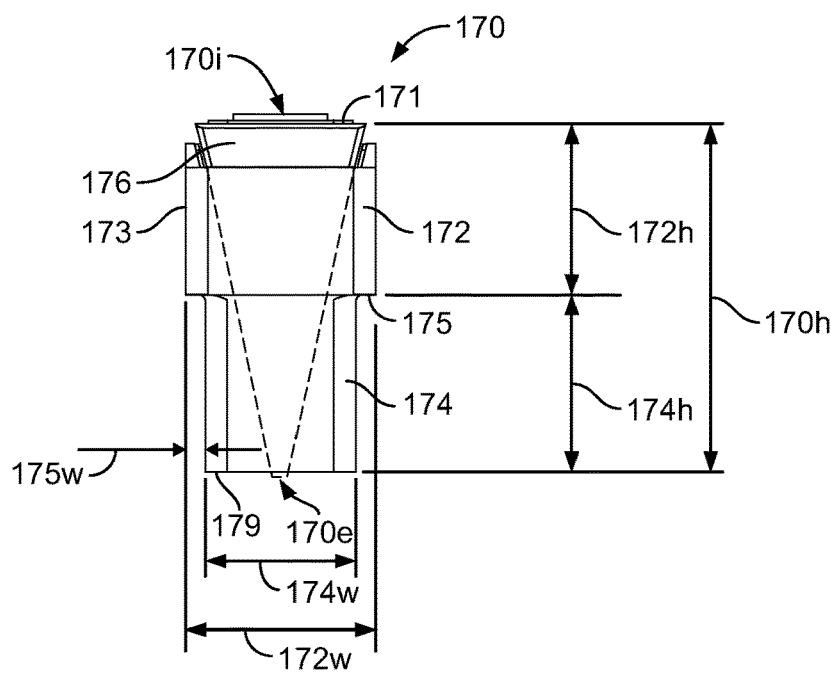
FIG. 13 is a front view of the exemplary reed valve module depicted in FIG. 12.
Figure 14:
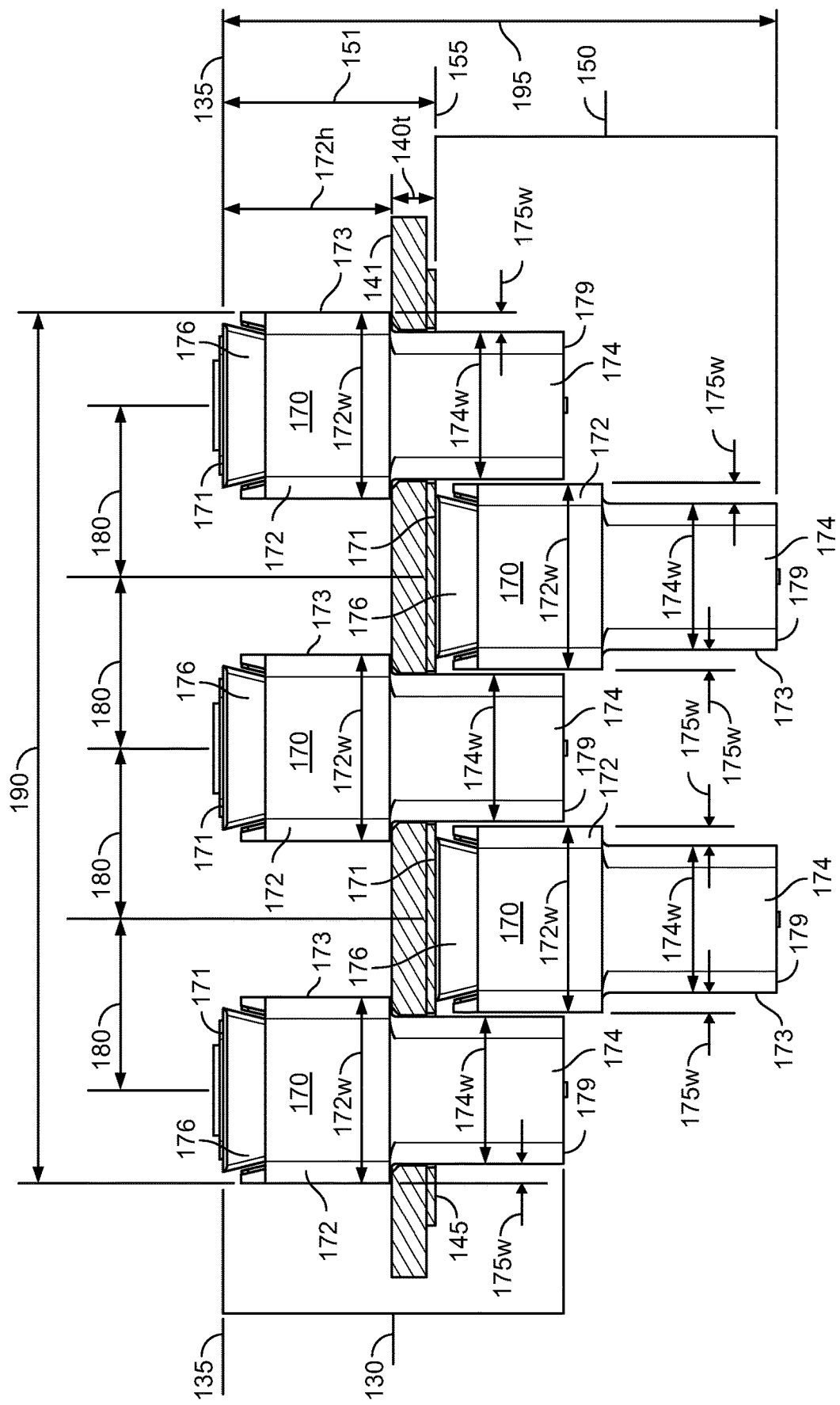
FIG. 14 is a partial cross-sectional front view of the illustrative stacked valve assembly shown in FIGS. 1-11 when viewed along the section line "14-14" of FIG. 1, showing a plurality of stacked and "nested" reed valve modules positioned above and below an intermediate seat plate.
Figure 15:
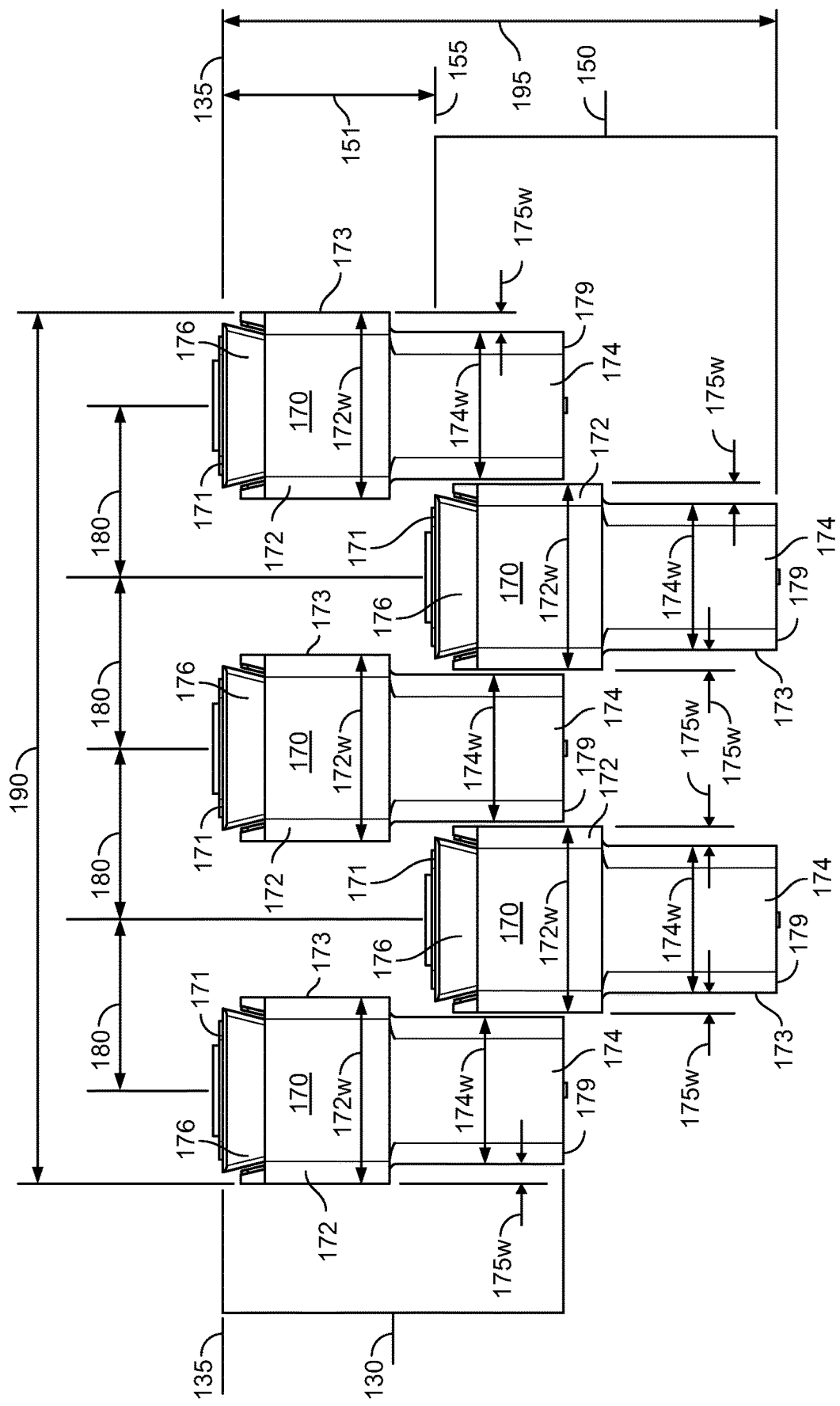
FIG. 15 is a partial cross-sectional front view of the stacked and "nested" reed valve modules depicted in FIG. 14, wherein the intermediate seat plate has been removed for additional drawing clarity.

Turning first to the stacked valve assembly 100 illustrated in FIGS. 1-15, FIGS. 1 and 1A depict isometric and exploded isometric views, respectively, of an illustrative embodiment of the stacked valve assembly 100, FIGS. 2 and 2A show cross-sectional and exploded cross-sectional isometric views, respectively, of the stacked valve assembly 100 shown in FIG. 1 when viewed along the section line "2-2" of FIG. 1, and FIGS. 3-5 illustrate close-up cross-sectional isometric views of a seat plate 120, an intermediate seat plate 140, and a carrier plate 160, respectively, of the stacked valve assembly 100 shown in FIGS. 2 and 2A. In addition, FIGS. 6 and 6A depict cross-sectional and exploded cross-sectional front views, respectively, of the stacked valve assembly 100 depicted in FIG. 1 when viewed along the section line "6-6" of FIG. 1, FIG. 7 is an isometric view of the illustrative stacked valve assembly 100 shown in FIG. 1 when viewed from below, FIG. 8 illustrates a cross-sectional isometric view of the stacked valve assembly depicted in FIG. 7 when viewed along the section line "8-8" of FIG. 7, and FIGS. 9-11 are close-up cross-sectional isometric views of the seat plate 120, the intermediate seat plate 140, and the carrier plate 160, respectively, of the stacked valve assembly shown in FIG. 8. Furthermore, FIGS. 12-13A show certain aspects of an exemplary reed valve module 170 that may be used in conjunction with any one or more of the various stacked valve assemblies disclosed herein, and FIGS. 14 and 15 are partial front cross-sectional views of the assembly 200 shown in FIG. 1 when viewed along the section lines "14-14" and "15-15," respectively, of FIG. 1 but showing only the installed reed valve modules 170, illustrating how the modules 170 may be stacked and "nested" so as to increase the effective flow area of the assembly 100.

With reference to FIGS. 1-11, an illustrative stacked valve assembly 100 is depicted, wherein in certain embodiments the stacked valve assembly 100 may include a seat plate 120, an intermediate seat plate 140, a carrier plate 160, and a plurality of reed valve modules 170 that are stacked and "nested" within and between the seat plate 120, intermediate seat plate 140, and carrier plate 160 in a staggered fashion so as to maximize the number of modules 170 that can fit within the diameter restrictions of the valve assembly 100. In the depicted embodiment, the stacked valve assembly 100 is held together by a plurality of fasteners 110, wherein the intermediate seat plate 140 is positioned (sandwiched) between the seat plate 120 and the carrier plate 160 when the stacked valve assembly 100 is in an assembled configuration. The fasteners 110 may be any one of several threaded fasteners known in the art, such as socket head cap screws and the like, although it should be understood that the disclosed subject matter is not limited to threaded fasteners of the type that are shown in FIGS. 1-2A and FIGS. 6-7. However, it should be understood by those of ordinary skill after a complete reading of the present disclosure that the fasteners 110 are a means known in the art that may be used to hold the various components of the stacked valve assembly 100 together, and that other means may also be used to serve this function. For example, in some embodiments an appropriately sized and positioned single fastener may be used, rather than the two fasteners shown in the figures. In other embodiments, fastening means other than threaded fasteners may be used, such as by using variations of a snap-fit design, press-fit components, and/or retaining rings, or by depending on mechanisms or elements positioned around the outside of the stacked valve assembly 100 to hold the various components together.

As is best shown in FIGS. 2, 2A, 6, and 6A, the plurality of reed valve modules 170 in the stacked valve assembly 100 may include a first plurality of reed valve modules 170 that are arranged in a first level 130 and a second plurality of reed valve modules 170 that are arranged in a second level 150, such that the first (upper) level 130 of reed valve modules 170 is positioned generally straddling the intermediate seat plate 140 and the second (lower) level 150 of reed valve modules 170 is generally positioned below the intermediate seat plate 140. Furthermore, the reed valve modules 170 in the first and second levels 130, 150 are "nested" in such a manner that a wider first (upper) portion 172 of each module 170 in the second level 150 is positioned immediately adjacent to a narrower second (lower) portion 174 of at least one module 170 in the first level 130. This arrangement allows the reed valve modules 170 that are stacked and "nested" in this manner to be more closely packed together, thereby enabling more modules 170 to be fit within a given valve diameter than may be possible with a standard valve configuration, as will be further described in conjunction with FIGS. 6, 6A, 14, and 15 below.

As depicted in FIGS. 1-11, the exemplary stacked valve assembly 100 has been configured as a compressor valve, wherein fluid flow through the stacked valve assembly 100 is in the direction indicated by flow arrows 102 and 104 (shown specifically in FIGS. 2, 6, and 8). In particular, the fluid flows 102/104 initially enter the stacked valve assembly 100 through respective flow passages 122/124 in the seat plate 120, pass through the first and second levels 130, 150 of reed valve modules 170, and exit the assembly 100 through respective outlets 162/166 in the carrier plate 160, as will be further described in detail below. However, as would be appreciated by those of ordinary skill after a complete reading of the present disclosure, a compressor valve is but one of many applications in which the disclosed stacked valve assemblies may be used, which would also include general check valve applications, non-return valve applications, and the like.

In certain illustrative embodiments, the seat plate 120 has a top surface 121 and a bottom surface 129 opposite of the top surface 120. Furthermore, the seat plate 120 may have a plurality of first flow passages 122 that provide fluid communication to the first plurality of reed valve modules 170 in the first level 130 for the fluid flow 102, and a plurality of second flow passages 124 that extend through the seat plate 120 from the top surface 121 to the bottom surface 129 and provide fluid communication to the second plurality of reed valve modules 170 in the second level 150 for the fluid flow 104. In addition, the seat plate 120 may also include one or more first cavities 126 that are adapted to house or contain at least a first (upper) portion 172 of one or more of the first plurality of reed valve modules 170 (see, FIGS. 13 and 13A) in the first level 130. Furthermore, each of the one or more first cavities 126 extends through the bottom surface 129 of the seat plate 120 and is substantially aligned with and in fluid communication with one or more of the respective first flow passages 122.

In various embodiments, each of the first flow passages 122 may be smaller in at least one lateral direction than the correspondingly aligned first cavity 126 that is positioned below each. Such offset lateral dimensions may therefore provide a "stepped" configuration that is marked by the presence of one or more first upper seating surfaces 125 that laterally transition between the sides of each of the first flow passages 122 and the sides of the corresponding first cavities 126, as is specifically shown in at least FIGS. 3, 6A, and 9. Furthermore, when the stacked valve assembly 100 is in the assembled configuration, each upper seating surface 125 is adapted to capture the upper seating face 171 (see, FIGS. 6A, 12, 12A, 13, and 13A) of a respective one of the reed valve modules 170 that are arranged in the first level 130. Moreover, in particular embodiments the seating surface 171 of each reed valve module 170 in the first (upper) level 130 is configured to substantially completely surround a respective first flow passage 122, and may also be brought into mating or contacting engagement with a corresponding upper seating surface 125 on the seat plate 120. In this configuration, substantially all of the fluid flow 102 through each passage 122 is thereby directed through a respective module 170, and bypass or leakage of any portion of the fluid flow 102 around the first level 130 of modules 170 is substantially prevented.

The intermediate seat plate 140 has a top surface 141 that is adapted to be brought into contact with the bottom surface 129 of the seat plate 120 when the stacked valve assembly 100 is in the fully assembled configuration. Additionally, the intermediate seat plate 140 includes a bottom surface 145 that is opposite of the top surface 141. In certain exemplary embodiments, the intermediate seat plate 140 has a plurality of first openings 142 and 146 that, in the assembled configuration, are also substantially aligned with the respective first cavities 126 and the respective first flow passages 122 positioned thereabove.

In the particular embodiments illustrated in FIGS. 1A, 2, 3, 3A, 4, 8, 9, and 10, the first openings 142 are each single openings that are adapted to be aligned with a corresponding one of the first cavities 126, and the first opening 146 is a single opening that is adapted to be aligned with two adjacent first cavities 126. However, it should be understood that the positions and sizes of the first openings 142 and 146 in the intermediate seat plate 140 are illustrative only, and are based upon an exemplary quantity and arrangement of reed valve modules 170 in each of the first and second levels 130, 150 of reed valve modules 170, as will be further discussed below. As such, the particular positions and sizes of the first openings 142 and 146 depicted in the attached figures—that is, wherein each first opening 142 corresponds to a single cavity 126 and the first opening 146 corresponds to two cavities 126—should not be considered as limiting on the present disclosure in any way. For example, the intermediate seat plate 140 could be designed only with first openings that correspond to a single cavity 126 (such as the openings 142), or it could be designed only with first openings that correspond to two or more cavities 126 (such as the opening 146), depending on the required structural and mechanical integrity of the various mating and supporting components.

In some embodiments, each first opening 142 may be smaller in at least one lateral direction than the corresponding aligned first cavity 126 that is positioned thereabove, such that the corresponding first cavity 126 exposes or reveals a portion 141a of the top surface 141 of the intermediate seat plate 140 surrounding the respective first opening 142. Similarly, the first opening 146 may also be smaller in at least one lateral direction than the corresponding two aligned first cavities 126 that are positioned thereabove, so that the corresponding first cavities 126 expose or reveal another portion 141a of the top surface 141 that surrounds the first opening 146. These offset size arrangements may therefore provide a "stepped" configuration that is similar to that marked by the upper seating surfaces 125 that transition between each of the first flow passages 122 and the corresponding first cavities 126. In certain embodiments, the portions 141a of the top surface 141 that are revealed by these offset or "stepped" configurations may therefore provide surfaces that are adapted to support each of the first plurality of reed valve modules 170 in the first level 130. For example, as is best shown in FIGS. 6A and 13A, a first (upper) portion 172 of each reed valve module 170 has a lateral width 172w that is greater than the lateral width 174w of a second (lower) portion 174 of the reed valve module 170. The sides of the first portion 172 of each reed valve module 170 are therefore laterally offset from the sides of the second portion 174 by a lateral distance 175w, thus presenting a "stepped" configuration having an intermediate support surface 175 at the bottom end of the first portion 172 of each module 170.

In the fully assembled configuration, the intermediate support surface 175 of each of the plurality of reed valve modules 170 in the first level 130 is therefore also captured by the exposed/revealed portion 141a of the top surface 141 of the intermediate seat plate 140 surrounding each of the respective first openings 142 and 146, and in certain embodiments may also be used to support the module from the exposed portion 141a of the top surface 141. In such embodiments, the depth 126d of each first cavity 126 (see, FIGS. 3 and 6A) may be substantially equal to the height 172h of the first (upper) portion 172 of each reed valve module 170 in the first (upper) level 130. Such a cavity depth 126d may therefore allow the seating faces 171 on the first level reed valve modules 170 to properly seat against corresponding upper seating surfaces 125 on the seat plate 120 in order to substantially prevent fluid bypass of the first level modules 170 as noted above, while also allowing the intermediate support surfaces 175 to support the first level modules 170 through supporting contact with corresponding exposed portions 141a on the top surface 141 of the intermediate seat plate 140. However, in other illustrative embodiments, each reed valve module 170 in the first level 130 may instead be supported by the bottom surface 179 of the second portion 174 of the module 170 (see, FIGS. 6A, 13, and 13A) rather than by the intermediate support surface 175, as will be further described below in conjunction with the illustrative stacked valve assembly 200 shown in FIGS. 17-24.

As is shown the embodiment depicted in FIGS. 1-11, the first (upper) portion 172 of each reed valve module 170 that is arranged in the first level 130 is held in place above the top surface 141 of the intermediate seat plate 140, and between the exposed portions 141a on the top surface 141 and the respective upper seating surfaces 125 of the seat plate 120. Additionally, the seating face 171 surrounding each flow inlet 170i are substantially co-planar with a first plane 135, as is shown at least in FIGS. 2, 6, 6A, 8, 12, 13, 14, and 15. Furthermore, the second (lower) portion 174 of each first level reed valve module 170 extends downward through a corresponding first hole 142 or 146 in the intermediate seat plate 140 and into the carrier plate 160, as will be further described below.

As is shown in at least in FIGS. 1A, 2A, 3-4, and 8-10, the intermediate seat plate 140 may also include a plurality of second openings 144, each of which are substantially aligned with a respective pair of second flow passages 124 in the seat plate 120. In the depicted embodiment, the position of each second opening 144 substantially mirrors the position of a corresponding pair of second flow passages 124. Furthermore, as noted above with respect to the description of the first openings 146, the size and position of the second openings 144 as depicted in the attached figures are exemplary only, and therefore could be modified as desired such that each second opening is sized and positioned so as to correspond to a single one of the second flow passages 124. Moreover, the size and position of each pair of second flow passages 124 may be similarly modified so as to form a single second flow passage 124 that corresponds to a respective individual second opening 144. Accordingly, whenever references are made to pairs of second flow passages 124 in the description below, it should be understood that such references also apply to those embodiments in which a single second flow passage 124 is used and aligned with an individual second opening 144 and an individual flow outlet opening 166.

With reference to at least FIGS. 1A, 2A, and 3-11, the carrier plate 160 has a top surface 161 and a bottom surface 169 that is opposite of the top surface 161. Furthermore, the top surface 161 is adapted to be brought into contact with at least a portion of the bottom surface 145 of the intermediate seat plate 140 when the stacked valve assembly 100 is in the assembled configuration. In some illustrative embodiments, the extreme end of the stacked valve assembly 100 at either one or both of the seat plate 120 and/or the carrier plate 160 may have a portion with a reduced outside diameter, which may be used to fix the valve assembly 100 to a piece of equipment, such as to the cylinder of a compressor, so as to prevent fluid from leaking around the valve during operation. For example, in the depicted embodiment the carrier plate 160 may include a nose 168 that has a reduced outside diameter 168d relative to the outside diameter 160d of the carrier plate 160 (which may also be the outside diameter of each of the other major structural components of the stacked valve assembly 100, i.e., the seat plate 120 and the intermediate seat plate 140).

With continuing reference to the exemplary embodiment of the stacked valve assembly 100 shown in FIGS. 1-11, the carrier plate 160 has an upper cavity region 163 that is adapted to house or contain the wider first (upper) portions 172 of one or more of the second plurality of reed valve modules 170 in the second level 150. Additionally, the carrier plate 150 may include a plurality of outlet flow passages 162, each of which is adapted to be aligned with and in fluid communication with one of the first flow passages 122 in the seat plate 120, thus allowing the fluid flow 102 to pass between the first flow passages 122 and the outlet flow passages 162 via respective reed valve modules 170 in the first level 130. Furthermore, as is best shown for this embodiment in FIG. 6A, the first openings 142, 146 in the intermediate seat plate 140 may be substantially vertically aligned with a respective first flow passage 122 in the seat plate 120 and a respective outlet flow passage 162 in the carrier plate 160. Therefore, in operation, the fluid flow 102 that passes through the first fluid flow passages 122 and the first plurality of reed valve modules 170 in the first level 130 exits the stacked valve assembly 100 via the outlet flow passages 162. See, e.g., FIGS. 2, 6, and 8.

As noted previously, a first (upper) portion 172 of each reed valve module 170 that is arranged in the first level 130 of reed valve modules 170 is held in place between the exposed portion 141a of the top surface 141 of the intermediate seat plate 140 and a respective upper seating surface 125 of the seat plate 120, such that the seating faces 171 of the first plurality of reed valve modules 170 are substantially co-planar with the first plane 135. Furthermore, a narrower second (lower) portion 174 of each first level reed valve module 170 extends through a corresponding first hole 142 or 146 in the intermediate seat plate 140 and downward into a portion of the upper cavity region 163, such that the upper cavity region 163 also houses a part of the second portion 174 of each module 170 in the first level 130 that extends below the intermediate seat plate 140.

In some embodiments, the carrier plate 160 includes a plurality of second cavities 164, each of which is substantially aligned and in fluid communication with a respective second opening 144 in the intermediate seat plate 140 and a respective pair of the second flow passages 124 in the seat plate 120 (or a single respective second flow passage 124 for those embodiments where the number and position of second openings 144 and second flow passages 124 may be the same). Furthermore, the carrier plate 160 may also include a plurality of flow outlet openings 166, each of which is adapted to be aligned with and in fluid communication with a respective pair of the second flow passages 124 in the seat plate 120, thus allowing the fluid flow 104 to pass between the second flow passages 124 and the outlet flow openings 166 via respective reed valve modules 170 in the second level 130. Additionally, as is best shown for this embodiment in FIG. 6A, the second cavities 164 in the carrier plate 160 may be substantially vertically aligned with a respective one of the second openings 144 in the intermediate seat plate 140 as well as a respective pair of second flow passages 124 and a respective outlet flow opening 166. See, e.g., FIGS. 2, 6, and 8.

Figure 5:
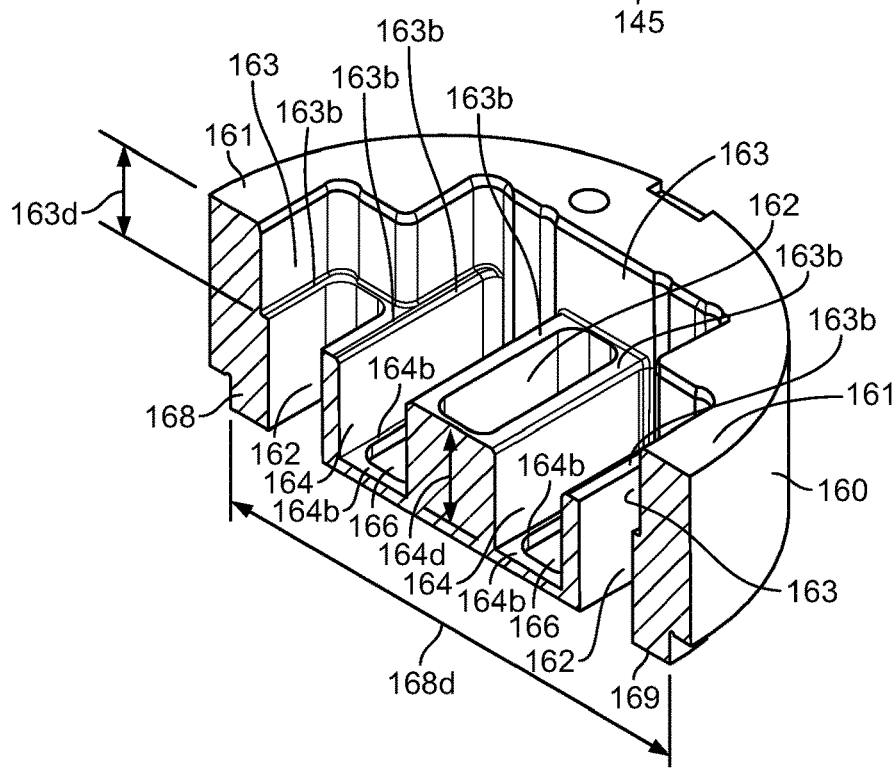
Figure 6A:
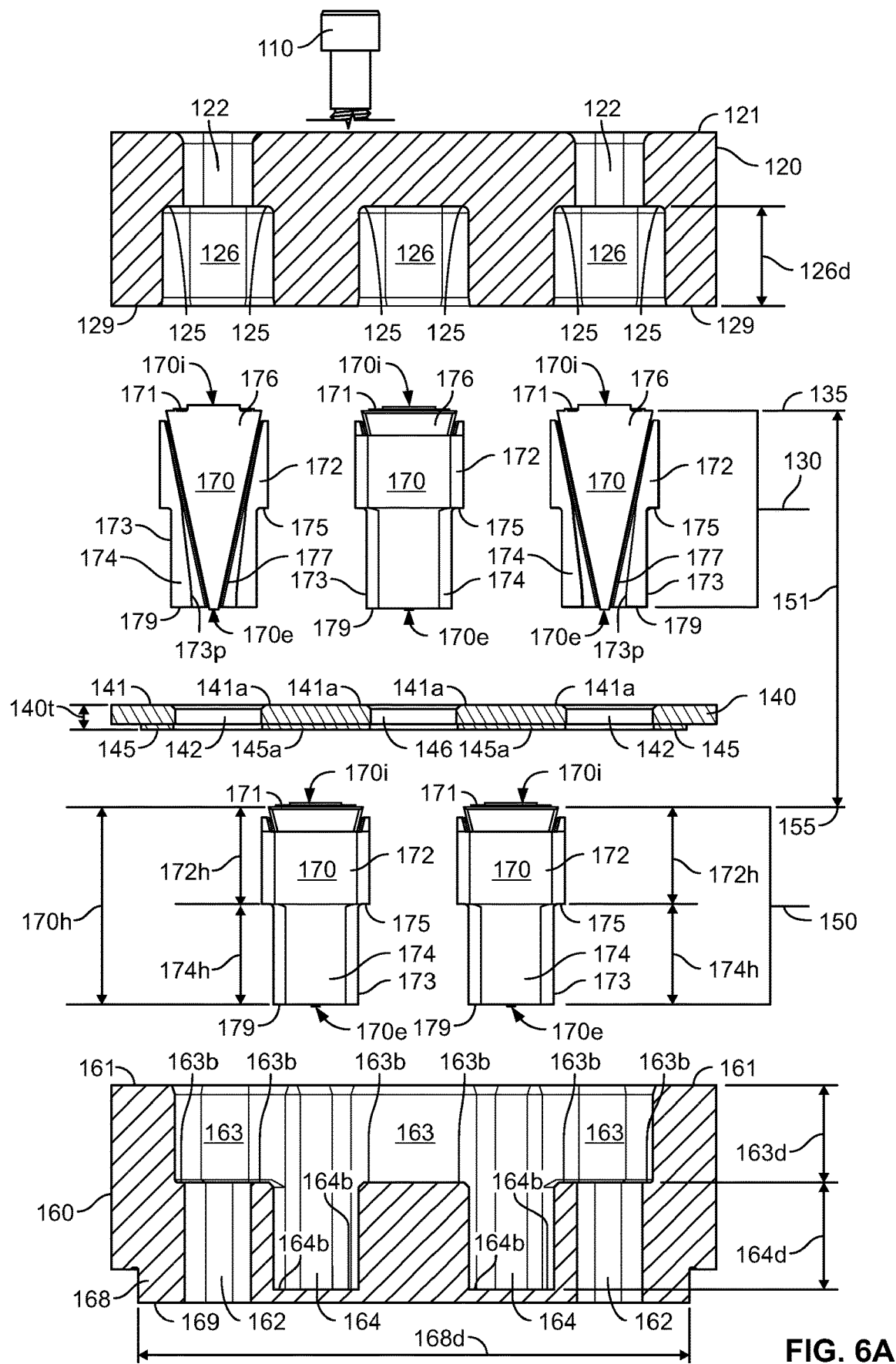
FIG. 6A is an exploded cross-sectional front view of the exemplary stacked valve assembly shown in FIG. 6.
Figure 11:
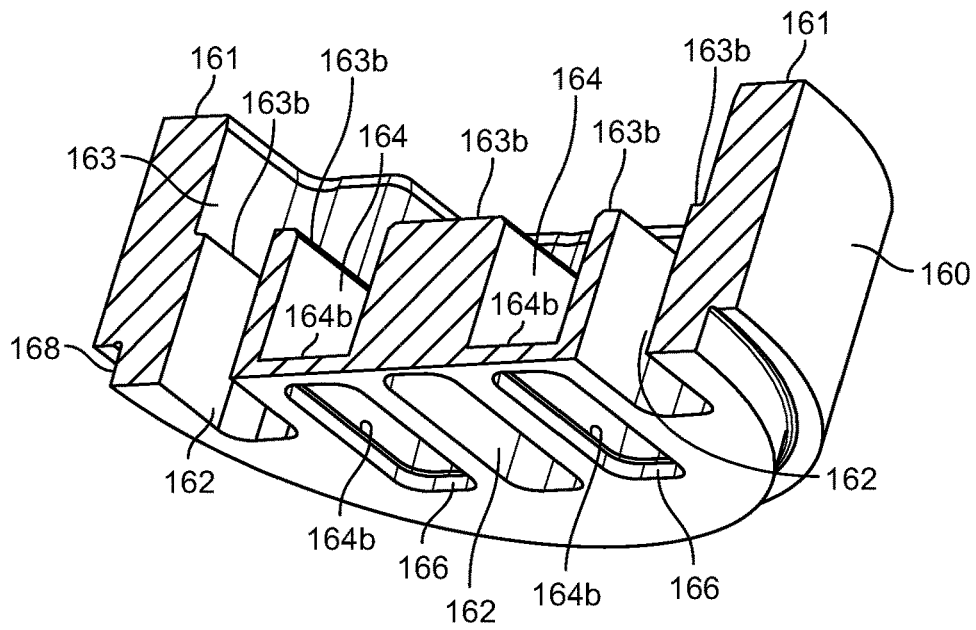

With reference to at least FIGS. 5, 6A, and 11, the upper cavity region 163 has a bottom surface 163b that laterally transitions between the sides of the upper cavity region 163 and at least some adjacent sides of the flow outlet passages 162 and the second cavities 164. Additionally, some portions of the bottom surface 163b laterally transition between the sides of the second cavities 164 and at least some portions of the sides of the adjacent flow outlet passages 162. In some embodiments, each of the second cavities 164 may also have a bottom surface 164b that laterally transitions between the sides of each second cavity 164 and at least some opposing sides of the flow outlet openings 166 through the bottom of the carrier plate 160.

For the illustrative embodiments depicted in FIGS. 1-11, the upper (wider) portions 172 of each of the second plurality of reed valve modules 170 that are arranged in the second level 150 of reed valve modules 170 are substantially completely contained within the upper cavity region 163 and the second cavities 164 of the carrier plate 160 when the stacked valve assembly 100 is in the fully assembled configuration. In particular, the second level reed valve modules 170 are positioned within the carrier plate 160 such that the wider first (upper) portion 172 of each second level module 170 is substantially completely located within a portion of the upper cavity region 163 and the narrower second (lower) portion 174 of each second level module 170 is substantially completely located within a respective one of the second cavities 164. Additionally, each of the second plurality of reed valve modules 170 is arranged in the second level 150 such that it is substantially aligned with and in fluid communication with a corresponding one of the flow outlet openings 166. Accordingly, when in operation, the fluid flow 104 that flows into the stacked valve assembly 100 through the second flow passages 124 and passes through the second openings 144 and the second plurality of reed valve modules 170 in the second level 150 exits the stacked valve assembly 100 via the outlet flow openings 166.

With continuing reference to FIGS. 1-11, when the stacked valve assembly 100 is assembled, the lower seating surface portions 145a on the bottom surface 145 of the intermediate seat plate 140 in the areas surrounding each of the second openings 144 capture the upper seating faces 171 of each of the second plurality of reed valve modules 170. Moreover, in particular embodiments, the upper seating face 171 of each of the second level reed valve modules 170 is configured to substantially completely surround a respective second opening 144, and may also be brought into mating or contacting engagement with a respective one of the lower seating surface portions 145a on the bottom surface 145 of the intermediate seat plate 140. When configured in this fashion, substantially all of the fluid flow 104 through each pair of second flow passages 124 and respective second opening 144 is thereby directed through a respective module 170, and bypass or leakage of any portion of the fluid flow 104 around the second level 150 of modules 170 is substantially prevented.

Accordingly, when in the fully assembled configuration, the first (upper) portion 172 of each of the second plurality of reed valve modules 170 that are arranged in the second level 150 is held in place between the second level valve module support surface 163b and a lower seating surface portion 145a on the bottom surface 145 of the intermediate seat plate 140. In such embodiments, the depth 163d of upper cavity region 163 (see, FIGS. 5 and 6A) may be substantially equal to the height 172h of the first (upper) portion 172 of each reed valve module 170 in the second (lower) level 150. Such a cavity depth 163d may therefore allow the seating faces 171 on the second level modules 170 to properly seat against corresponding lower seating surface portions 145a on the bottom 145 of the intermediate seat plate 140 in order to substantially prevent fluid bypass of the second level modules 170 as noted above, while also allowing the intermediate support surfaces 175 to support the second level modules 170 through supporting contact with corresponding portions of the bottom surface 163b of the upper cavity region 163. Furthermore, the seating faces 171 surrounding the flow inlets 170i to each of the second plurality of reed valve modules 170 are also substantially co-planar with a second plane 155 that is offset below the first plane 135 by a distance 151 that is substantially equal to the height 172h of the first (upper) portions 172 of the reed valve modules 170 plus the total thickness 140t of the intermediate seat plate 140.

In certain illustrative embodiments, the combined depth 163d of the upper cavity region 163 and the thickness 140t of the intermediate seat plate 140 is at least equal to, but preferably greater than, the height 174h of the second (lower) portion 174 of each reed valve module 170 in the first level 130. In those embodiments when the depth 163d plus the thickness 140t is greater than the height 174h, a gap is thereby created between the bottom surface 179 of each first level reed valve module 170 and the bottom surfaces 163b of the upper cavity region 163, as is best shown in FIGS. 2, 6, and 8. This in turn guards against the bottom surface 179 of any of the first level reed valve modules 170 from coming into contact with the bottom surface 164b of a respective second cavity 164, which could affect the proper positioning of the first portions 172 of each first level module 170 within the first cavities 126 and the proper seating of the seating faces 171 with the upper seating surfaces 125.

In other embodiments, the depth 164d of each second cavity 164 (see, FIGS. 5 and 6A) may be greater than the height 174h of the lower portion 174 of each reed valve module 170 in the second level 150. This depth 164d serves to create a gap between the bottom surfaces 179 of the second level reed valve modules 170 and the bottom surfaces 164b of each respective second cavity 164. This in turn allows the intermediate support surface 175 on each of the reed valve modules 170 in the second level 150 to be supported in the carrier plate 160 by contacting portions of the bottom surface 163b of the upper cavity region 163 that are located on at least opposing sides of each respective second cavity 164. Additionally, it guards against the bottom surface 179 of any of the second level reed valve modules 170 from coming into contact with the bottom surface 164b of a respective second cavity 164, which could affect the proper positioning and seating of the first portions 172 of each second level module 170 between the lower seating surface portion 145a on the intermediate seat plate 140 and the bottom surfaces 163b of the upper cavity region 163. However, as previously noted with respect to the first level reed valve modules 170, in at least some exemplary embodiments each of the reed valve modules 170 in the second level 150 may be supported by the bottom end 179 of the module 170 (see, FIGS. 6A, 13, and 13A) rather than the intermediate support surface 175. In such embodiments, the depth 164d and the spatial relationship between the first (upper) portions 172 of the second level reed valve modules 170 and the surfaces 145a and 163b would therefore differ from what is indicated above, as will be further described in conjunction with the illustrative stacked valve assembly 200 shown in FIGS. 17-24.

Figure 12A:
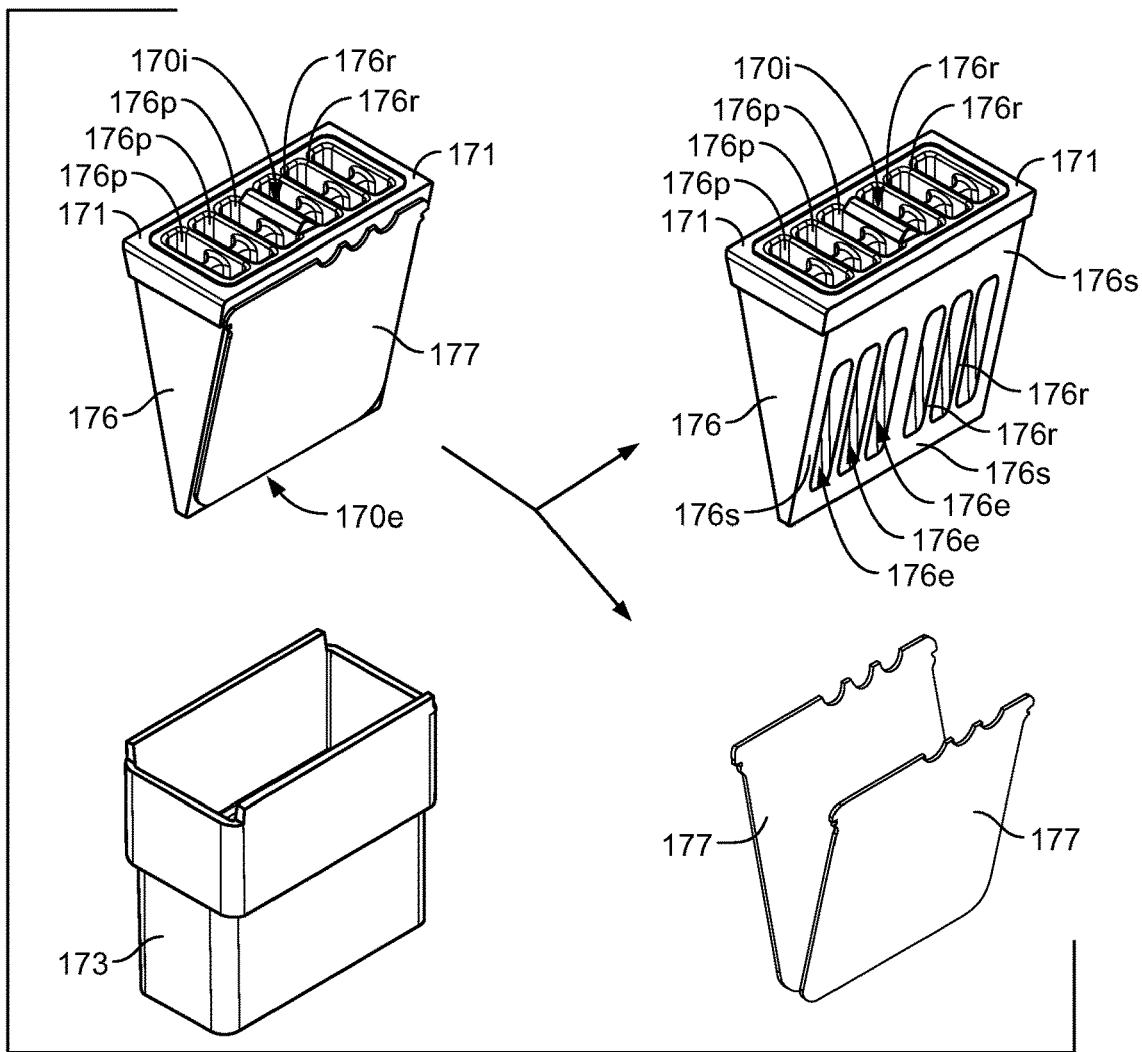
FIG. 12A is an exploded isometric view of the illustrative reed valve module shown in FIG. 12.

FIGS. 12-13A depict various relevant detailed aspects of one illustrative embodiment of a reed valve module 170 that may be used in conjunction with any of the stacked valve assemblies disclosed herein. In particular, FIGS. 12 and 12A are isometric and exploded isometric views of an exemplary reed valve module 170, and FIGS. 13 and 13A are front elevation and exploded front elevation views of the reed valve module shown in FIGS. 12-12A. As shown in FIGS. 12-13A, the reed valve module 170 may include a module body 176, a plurality of reed petals 177, and a module housing 173. Furthermore, the flow inlet 170i is located at the upstream end of the reed valve module 170 (i.e., proximate the upper seating face 171) and the flow outlet 170e is located at the downstream end of the reed valve module 170 (i.e., proximate the bottom 179). Generally, the reed petals 177 are adapted to be held in place against opposing sides of the module body 176, and during operation, the reed petals 177 are adapted to seal against respective sealing surfaces 176s on each of the opposing sides of the module body 176 when the reed petals 177 are in the closed position.

As discussed above, the module body 176 may include an upper seating face 171 that is adapted to be captured by (and/or contacted by) one of an upper seating surface 125 in the seat plate 120 or a lower seating surface portion 145a of the intermediate seat plate 140, depending on if a particular reed valve module 170 is one of the first plurality of reed valve modules 170 arranged in the first level 130 or one of the second plurality of reed valve modules 170 arranged in the second level 150. Furthermore, each upper seating face 171 may substantially completely surround a respective flow inlet 170i of the reed valve module 170.

As best shown in FIGS. 12 and 12A, each reed valve module 170 may include a plurality of flow passages 176p that lead to a corresponding flow outlet or exit port 176e through a respective side of the module body 176, as is best shown in FIG. 12A. Also as shown in FIG. 12A, the sealing surfaces 176s on each respective side of the module body 176 may substantially completely surround and enclose each of the exit ports 176e through that respective side, as well as the exposed end surfaces of each of the ribs 176r on that respective side.

With continuing reference to at least FIG. 13, the module housing 173 in the first (upper) portion 172 of the reed valve module 170 may have a lateral width 172w that is greater than the lateral width 174w of the module housing 173 in the second (lower) portion 174 of the reed valve module 170, such that the sides of the first portion 172 are laterally offset from the sides of the second portion 174 by a distance 175w, thus defining a surface 175. Additionally, the first portion 172 has a height 172h, the second portion has a height 174h, and the reed valve module has an overall module height 170h that may be substantially equal to the combined heights 172h and 174h of the first and second portions 172 and 174, respectively.

As noted previously, for the embodiments of the stacked valve assembly 100 shown in FIGS. 1-11, the surface 175 may provide an intermediate support surface for the reed valve module 170 at the bottom end of the first portion 172 as described above with respect to embodiments of the stacked valve assembly 100 shown in FIGS. 1-11. In such embodiments, the intermediate support surface 175 may therefore be used to support at least some reed valve modules 170 from the exposed portions 141a of the top surface 141 of the intermediate support plate 140 (for the first level 130 of modules 170), or from the support surfaces 163b at the bottom of the upper cavity region 163 of the carrier plate 160 (for the second level 150 of modules 170), as previously described above. In certain other embodiments, each reed valve module 170 may instead be supported by the bottom surface 179 of the second portion 174 of the module 170 rather than the intermediate support surface 175, as will be further described below in conjunction with the exemplary stacked valve assembly 200 depicted in FIGS. 17-24.

As is shown in at least FIGS. 6A and 13A, the side sealing surfaces 176s of the module body 176 may convergingly taper downward from the upper seating face 171 toward the bottom 179 of the reed valve assembly 170. As will be appreciated by persons of ordinary skill after a complete reading of the present disclosure, the tapered configuration of the side sealing surfaces 176s enables the module housing 173 that encloses the module body 176 and the reeds petal 177 to have a lateral width 174w at the bottom 179 of the second (lower) portion 174 proximate the flow outlet 170e that is smaller than the lateral width 172w of its first (upper) portion 172 proximate the seating face 171 and flow inlet 170i. This in turn enables a tighter (i.e., more close) overall packing density of the pluralities of reed valve modules 170 in the first and second levels 130, 150 due to the "nesting" effect provided by the laterally offset sides of the upper and lower portions 172, 174 of the reed valve module 170, as will be further described in conjunction with FIGS. 14-16 below.

In general, the first and second pluralities of reed valve modules 170 in the respective first and second levels 130, 150 of reed valve modules 170 may be vertically stacked and laterally "nested" so as to provide the closest possible spacing between vertically and laterally adjacent reed valve modules 170. For example, in the embodiment depicted in FIGS. 1-11, a total of four reed valve modules 170 are arranged in the first level 130, and a total of four reed valve modules 170 are also arranged in the second level 150. These quantities of reed valve modules 170 are exemplary only, and are based upon an illustrative embodiment wherein all of the reed valve modules 170 are of a common size and configuration and are installed in an exemplary stacked valve assembly 100 having a nose 168 with a diameter 168d (or a valve diameter 160d, when a nose 168 is not used) that ranges from approximately 3.5" to 4.0".

In certain embodiments, each of the pluralities of reed valve modules 170 that are arranged in both the first level 130 and the second level 150 may be of substantially identical size and configuration, as is shown for the exemplary stacked valve assembly 100 illustrated in FIGS. 1-11. However, it should be appreciated by those of ordinary skill after a complete reading of the present disclosure that the reed valve modules 170 that are positioned in the second level 150 need not have the same configuration as the reed valve modules 170 that are positioned in the first level 130. For example, since the "nesting" the reed valve modules 170 is facilitated by the offset distance 175w between the sidewalls of the modules 170 positioned in the first (upper) level 130 but not by any type of offset distance between sidewalls of the modules positioned in the second (lower) level 150, in some embodiments the modules 170 in the second (lower) level 150 need not be offset in a similar fashion. Instead, some or all of the second level reed valve modules 170 may be substantially straight-sided, that is, wherein the width 174$w$ of the second (lower) portions 174 of the second level modules 170 is substantially the same as the width 172$w$ of the first (upper) portions 172. In certain other embodiments, some or all of the reed valve modules 170 in the second level 150 may have an offset distance 175$w$ that differs from the offset distance 174$w$ of the reed valve modules 170 in the first level 130. Furthermore, in such embodiments the offset distance 175$w$ of the first level modules 170 may either be greater than or less than the offset distance 175$w$ of the second level modules 170 without affecting the "nesting" arrangement of the modules 170.

It should be appreciated by those of ordinary skill that a stacked valve assembly 100 having a nose (or valve) diameter that is different from the 3.5"-4.0" size of the embodiment shown in FIGS. 1-11 could have a different number of reed valve modules 170—either more or fewer—depending on the particular size. Furthermore, it should be understood that, depending on the particular size of the reed valve modules 170 utilized, the quantity of reed valve modules 170 arranged in each of the first and second levels 130 and 150 also may not be same, i.e., the first level 130 may include more reed valve modules 170 than the second level 150, or vice versa. Moreover, while the first and second portions 172, 174 of the reed valve modules 170 arranged in both the first level 130 and the second level 150 might have the same offset lateral widths 172$w$, 174$w$ in order to facilitate the required "nesting" of laterally adjacent reed valve modules 170, the lengths 170L of the reed valve modules 170 in a direction that is substantially perpendicular to the widths 172$w$, 174$w$ (see, e.g., FIG. 12) and substantially parallel to the direction of fluid flow 102/104 through the assembly may be different. For example, the lengths 170L of the reed valve modules 170 in the first level 130 may be different from the lengths 170L of the reed valve modules 170 in the second level 150. Furthermore, it should also be understood that the lengths 170L of each reed valve module 170 within a given level 130 or 150 need not be the same, as reed valve modules 170 having differing widths may be mixed within any given level 130, 150.

Figure 16:
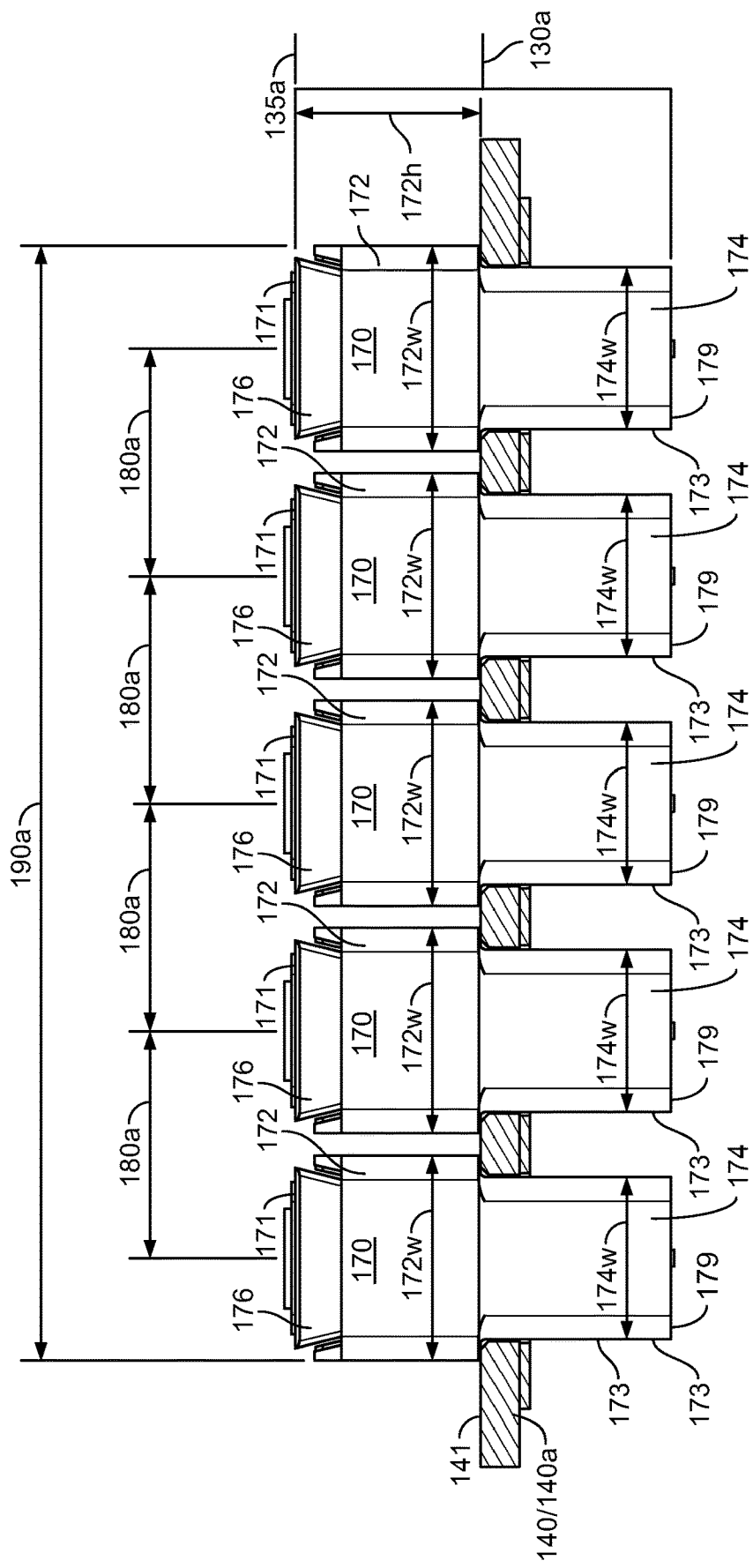
FIG. 16 is a partial cross-sectional front view of an illustrative standard/non-stacked reed valve module configuration, wherein all of the reed valve modules are positioned only above a seating element with their respective seating faces positioned in substantially the same plane.

FIGS. 14-16 illustrate various beneficial aspects of the exemplary stacked valve assemblies 100 of the present disclosure due to the "nesting" effect provided by the laterally offset sides of the upper and lower portion 172, 174 of at least the reed valve modules 170 that are arranged in the first level 130 of reed valve modules 170. More specifically, FIG. 14 depicts a partial cross-sectional front view of an exemplary stacked valve assembly 100 in accordance with FIGS. 1-11 when viewed along the section line "14-14" of FIG. 1, wherein only the illustrative reed valve modules 170 and intermediate seat plate 140 are shown, and FIG. 15 shows the stacked and "nested" reed valve modules of FIG. 14 wherein the intermediate seat plate 140 has been removed for further drawing clarity. Additionally, FIG. 16 is a partial cross-sectional front view of an exemplary "standard" or "non-stacked" reed valve module configuration, that is, wherein all of the plurality of reed valve modules 170 are positioned in a single level 130$a$ such that their seating faces 171 are all positioned in substantially the same plane, and wherein no other levels of reed valve modules 170 are positioned below and/or stacked and "nested" with the modules 170 of the single level 130$a$. The "standard" or "non-stacked" reed valve module configuration shown in FIG. 16 has been included for discussion and exemplary purposes so as to illustrate the benefits and advantages associated with the "nesting" aspects of the stacked valve configurations shown in FIGS. 14 and 15.

With reference to FIGS. 14 and 15, the first plurality of reed valve modules 170 are arranged in a first level 130 that substantially straddles an intermediate seat plate 140, and the second plurality of reed valve modules 170 are arranged in a second level 150 such that each module 170 in the second level 150 is positioned substantially entirely below the intermediate seat plate 140. In the depicted embodiment, a part of each reed valve module 170 arranged in the second level 150 is also positioned below a part of the wider first (upper) portion 172 of at least one respective module 170 that is arranged in the first level 130. Additionally, the upper seating faces 171 of the first plurality of reed valve modules 170 in the first level 130 are each substantially co-planar with a first plane 135 that is substantially parallel to the top surface 141 of the intermediate seat plate 140. Furthermore, the first plane 135 is vertically offset above the top surface 141 by a distance 172$h$, that is, by a distance that is substantially the same as the height 172$h$ of the first (upper) portions 172 of the reed valve modules 170, and may also be substantially co-planar with the upper seating surfaces 125 on the seating plate 120 (see, FIGS. 3, 6A, and 9). The upper seating faces 171 of the second plurality of reed valve modules 170 in the second level 150 are also substantially co-planar with a second plane 155 that is substantially parallel to the first plane 135, the second plane 155 is substantially co-planar with the lower seating surface portions 145$a$ on the bottom surface 145 of the intermediate seat plate 140. In the depicted embodiment, the second plane 155 is also vertically offset below the first plane 135 by a distance 151 that is substantially equal to the height 172$h$ of the first portions of the reed valve modules 170 in the first level 130 plus the total thickness 140$t$ of the intermediate seat plate 140. In some embodiments, the second plane 155 of the co-planar seating faces 171 of the second level reed valve modules 170 may also be substantially parallel to the bottom surface 145 of the intermediate seat plate 140, and in certain other embodiments the second plane 155 may also be co-planar with the bottom surface 145.

As shown in FIGS. 14 and 15, the adjacent reed valve modules 170 of the plurality of stacked reed valve modules 170—which for purposes of the present discussion is a combination of both the first and second pluralities of reed valve modules 170 in the first and second levels 130, 150—have a center-to-center lateral spacing distance 180. Additionally, the plurality of stacked reed valve modules 170 in both the first and second levels 130, 150 have an overall lateral grouping width 190 that is substantially equal to the sum of the center-to-center spacing distances 180 (e.g., four times the spacing distance 180 for the illustrative embodiment of FIGS. 14 and 15), plus the lateral width 172$w$ of the first (upper) portions of the reed valve modules 170 in the first level 130. Additionally, the stacked and "nested" reed valve module configuration depicted in FIGS. 14 and 15 has an overall stack height 195 that is substantially equal to the height 172$h$ (see, FIGS. 6A and 13) of the first (upper) portions 172 of the first level 130 of reed valve modules 170, the thickness 140$t$ of the intermediate seat plate 140, and the overall module height 170$h$ of the second level of reed valve modules 150.

The lateral spacing distance 180 between the adjacent reed valve modules 170 in the stacked reed valve module configurations of the present disclosure that are depicted in FIGS. 14 and 15 is generally smaller than would be the case in a typical "standard" or "non-stacked" reed valve module configuration (see, e.g., FIG. 16, discussed below), due to the "nesting" effect between the first and second levels 130, 150 of reed valve modules 170. More specifically, as shown in FIGS. 14 and 15, the side surfaces of the first (upper) portions 172 of the second level 150 of reed valve modules 170 are positioned proximate the side surfaces of the second (lower) portions 174 of the first level 130 of reed valve modules 170. Furthermore, in this configuration, part of the first portions 172 of each of the reed valve modules 170 in the first level 130 laterally overhang corresponding first portions 172 of the reed valve modules 170 that are positioned therebelow in the second level 150 of reed valve modules 170, thereby nesting parts of the second level modules 170 below overhanging parts of the first level modules 170 without obstructing the fluid flow 104 (see, FIGS. 2, 6, and 8) to the flow inlets 170i of each of the second level modules 170.

When "nested" in this manner, the lateral spacing distance 180 between adjacent reed valve modules 170 of the stacked reed valve module configurations depicted in FIGS. 14 and 15 can be as small as the lateral width 174w of the second (lower) portions of the reed valve modules 170 in the second level, assuming that the side surfaces of the first (upper) reed valve module portions 172 in the second level 150 can be brought as close together as being in substantially direct contact with the side surfaces of the second (lower) reed valve module portion 174 in the first level 130. For the exemplary embodiment depicted in FIGS. 14 and 15, the overall lateral grouping width 190 of the stacked reed valve module configuration may therefore be as small as four times the lateral width 174w of the second reed valve module portions 174 plus the lateral width 172w of the first reed valve module portions 172.

FIG. 16 illustrates a "standard" or "non-stacked" reed valve module configuration wherein all of the reed valve modules 170 are arranged in a single level 130a that straddles the intermediate seat plate such that all of the upper seating faces 171 are substantially co-planar to a first plane 135a that is vertically offset from the top surface 141 of the intermediate seat plate 140 by a distance 172h. In the exemplary configuration shown in FIG. 16, the center-to-center lateral spacing distance 280a between adjacent reed valve modules 170 can be no smaller than the lateral width 172w of the first (upper) portions of the reed valve modules 170, assuming again that the closest that the side surfaces of the first reed valve module portions 172 can be brought together would be to bring them into substantially direct side-to-side contact. As such, for the embodiment depicted in FIG. 16, the smallest overall lateral grouping width 190a when the plurality of reed valve modules 170 are arranged in the single level 130a would be five times the lateral width 172w of the first (upper) portions of the reed valve modules 170.

Based on a comparison of the "stacked" reed valve module configuration shown in FIGS. 14 and 15 to the "standard" or "non-stacked" reed valve module configuration of FIG. 16, it can readily be seen that the "nesting" effect provided by the laterally offset sides of the upper and lower portions 172, 174 of the reed valve modules 170 can result in a significant reduction in the center-to-center lateral spacing distance 180 between adjacent reed valve modules 170, and consequently a commensurate increase in the packing density of the reed valve modules 170 within a stacked valve assembly 100 in accordance with the present disclosure. For example, a stacked valve assembly that utilizes a stacked reed valve module configuration as described herein can have an effective flow area that is up to 50% greater than that of the "standard" or "non-stacked" valve configuration depicted in FIG. 16, which may already have an effective flow area that is significantly higher than the typical prior art valves, and without a significant increase in the clearance volume of the valve.

Figure 17:
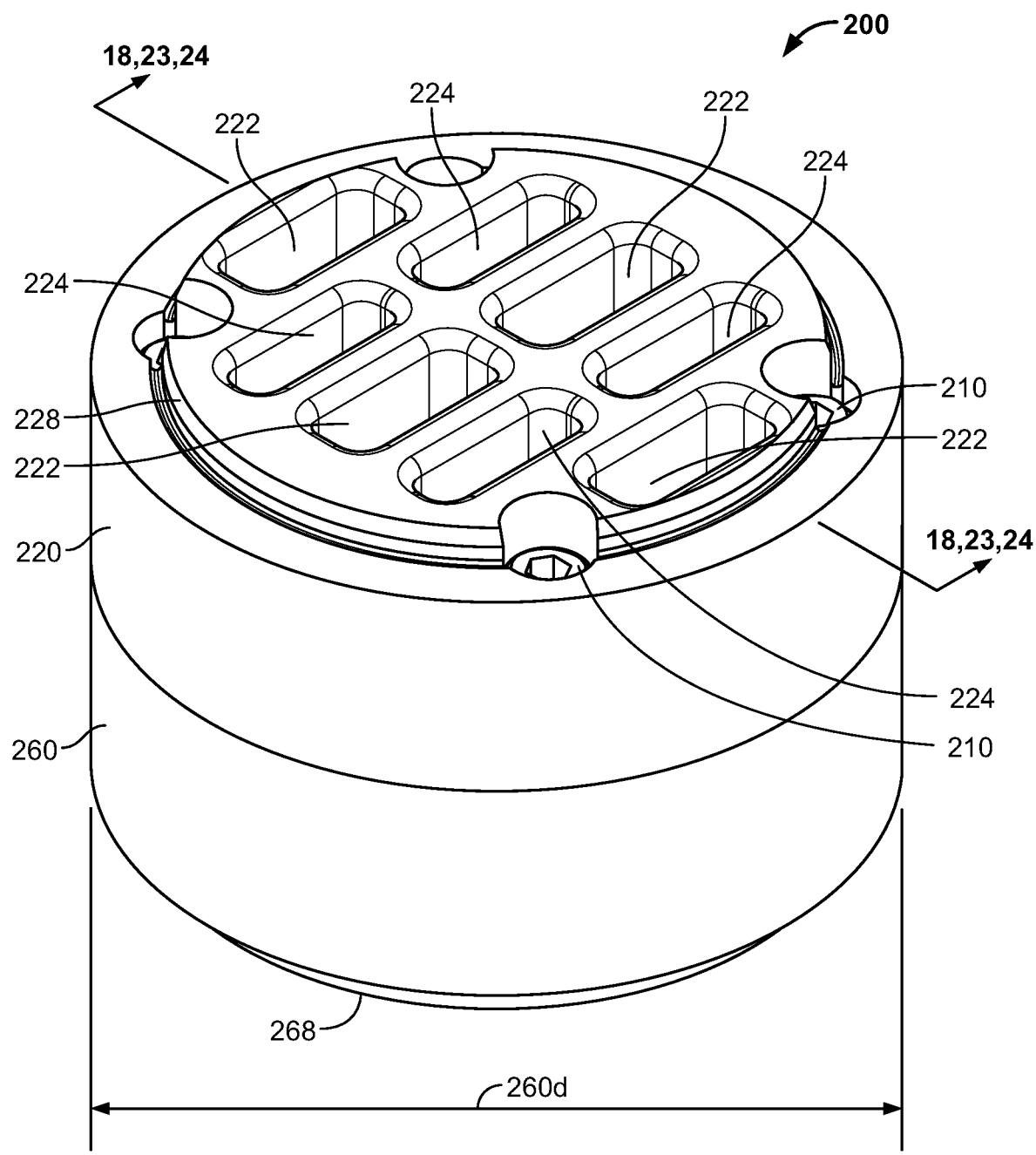
FIG. 17 is an isometric view of an illustrative stacked valve assembly in accordance with another exemplary embodiment disclosed herein.
Figure 18:
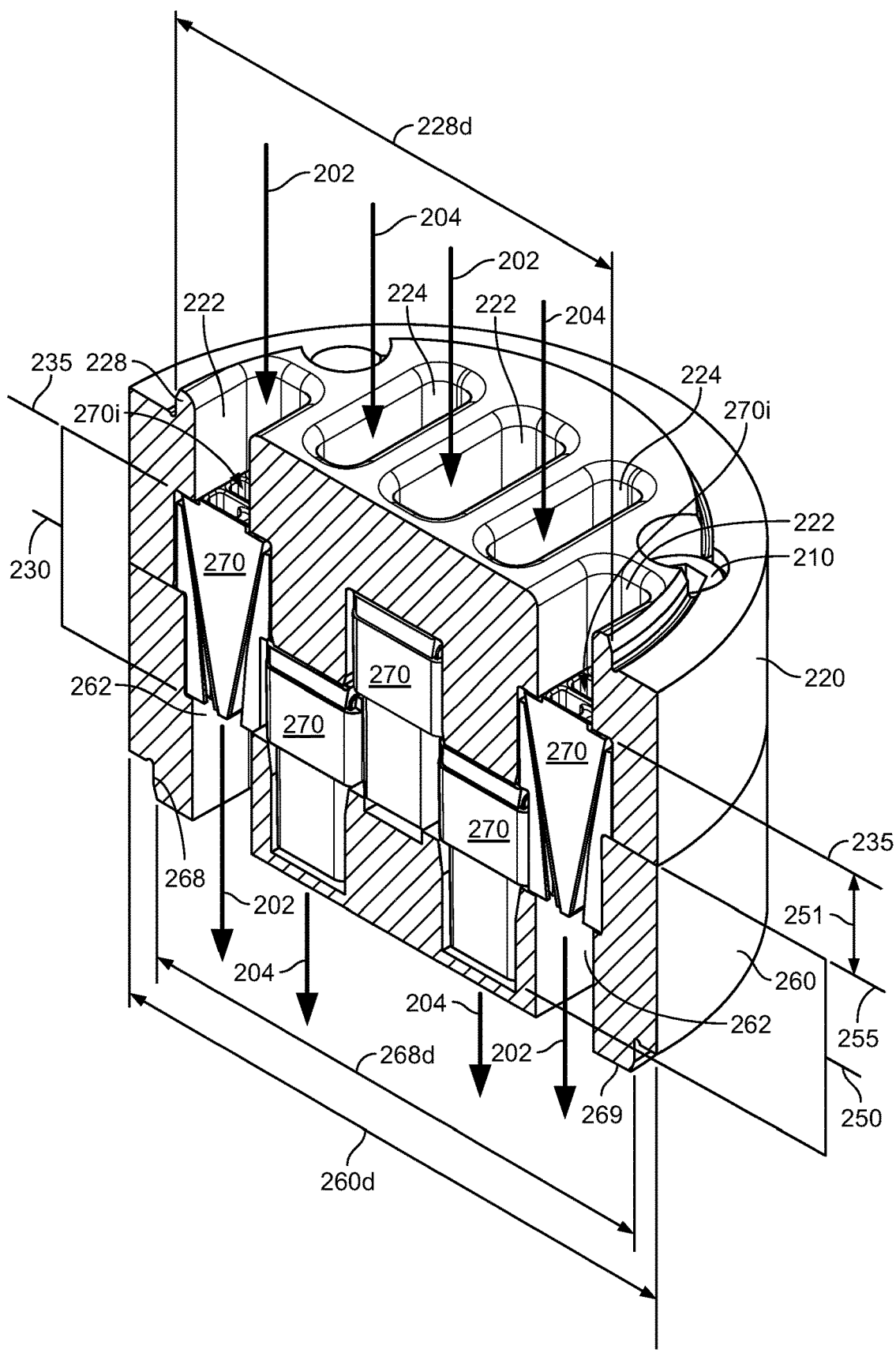
FIG. 18 is a cross-sectional isometric view of the stacked valve assembly depicted in FIG. 17 when viewed along the section line "18-18" of FIG. 17.
Figure 18A:
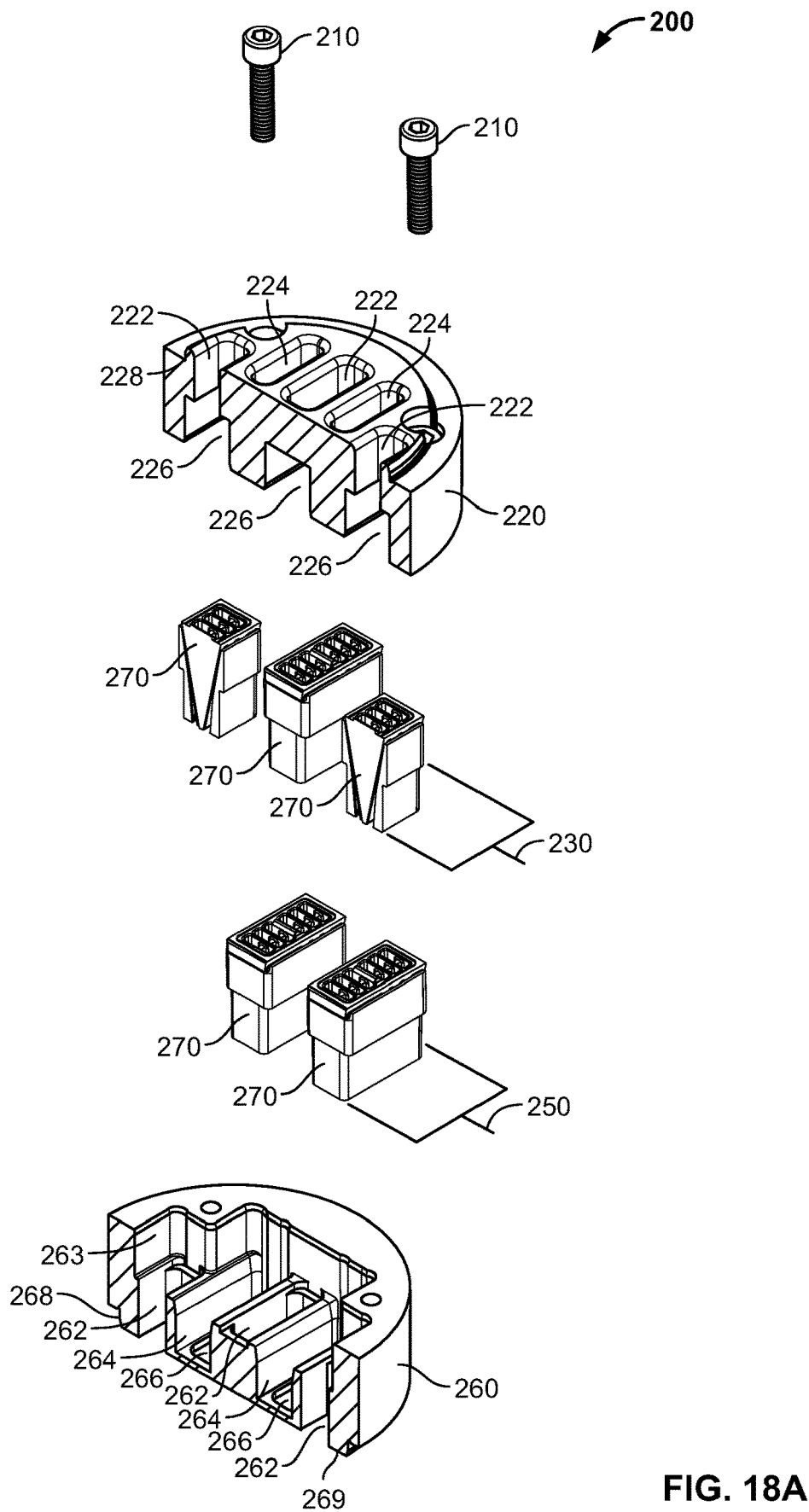
FIG. 18A is an exploded cross-sectional isometric view of the exemplary stacked valve assembly shown in FIG. 18.
Figure 19:
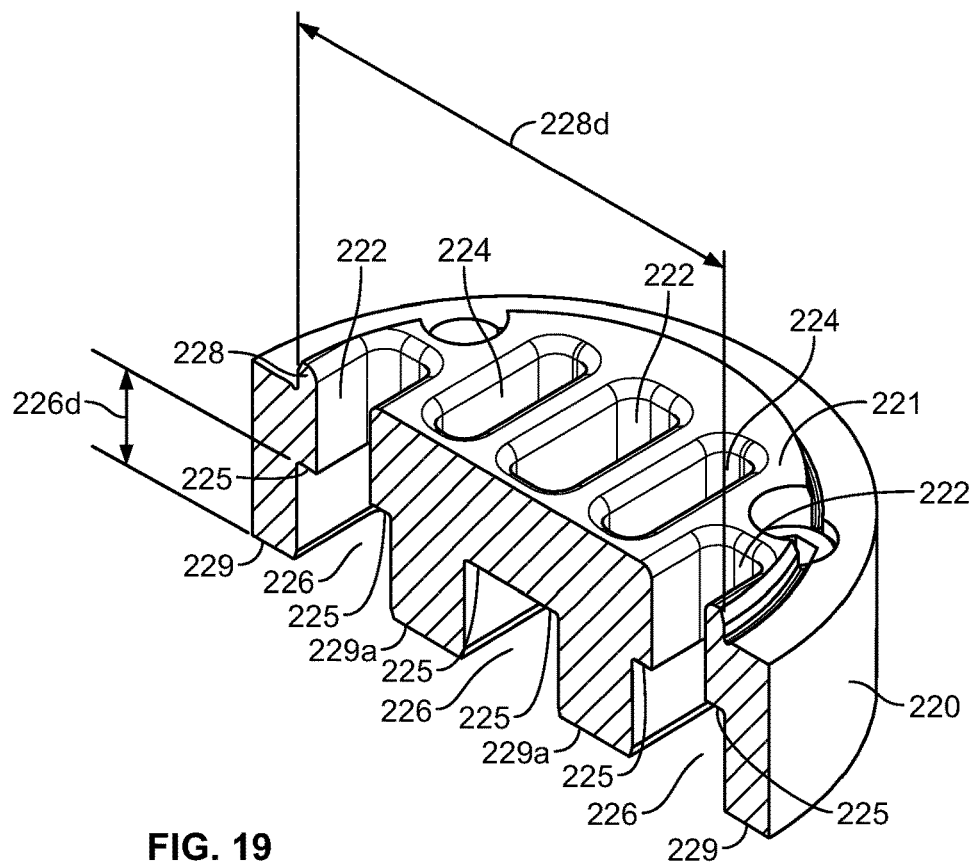
FIGS. 19 and 20 are close-up cross-sectional isometric views of various components of the illustrative stacked valve assembly shown in FIGS. 18 and 18A.
Figure 20:
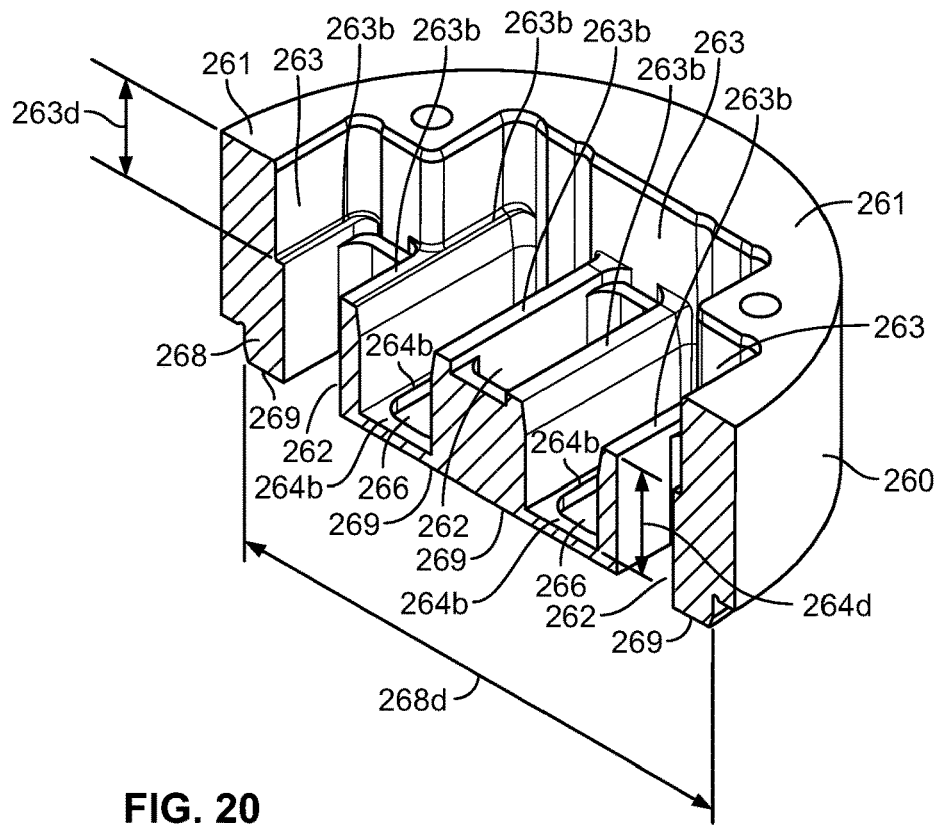
Figure 21:
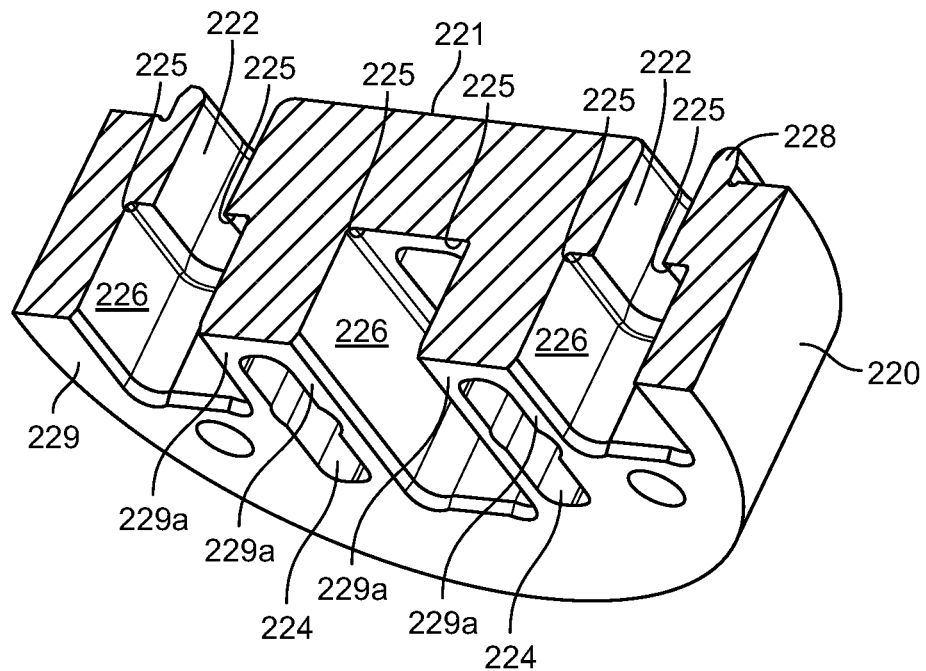
FIGS. 21 and 22 are close-up cross-sectional isometric views of various components of the illustrative stacked valve assembly shown in FIGS. 18 and 18A when viewed from below.
Figure 22:
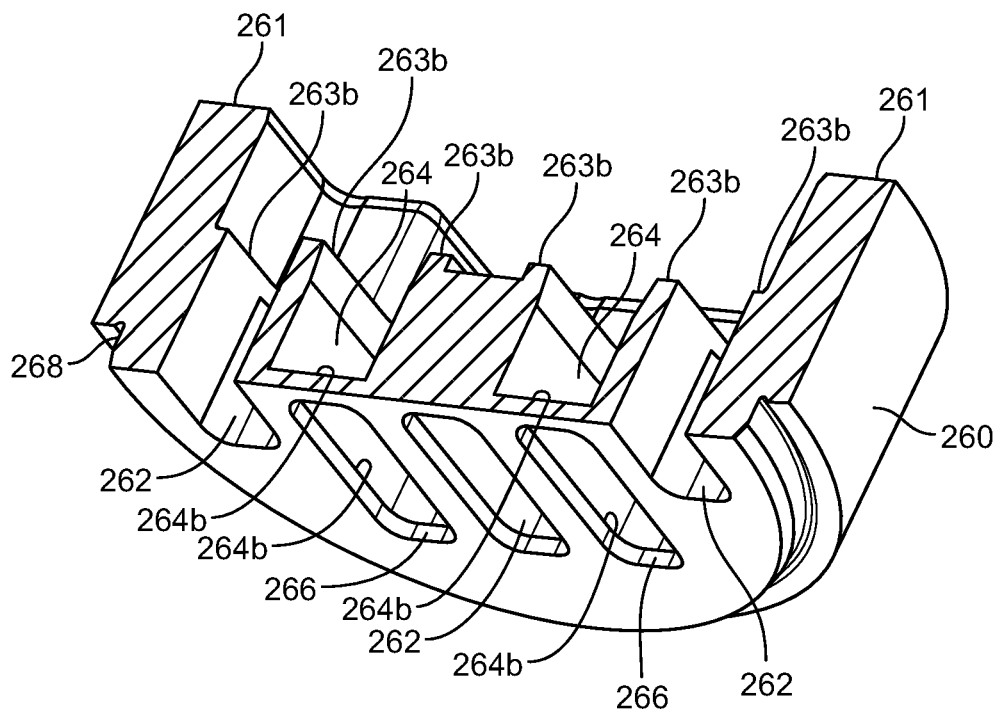
Figure 23:
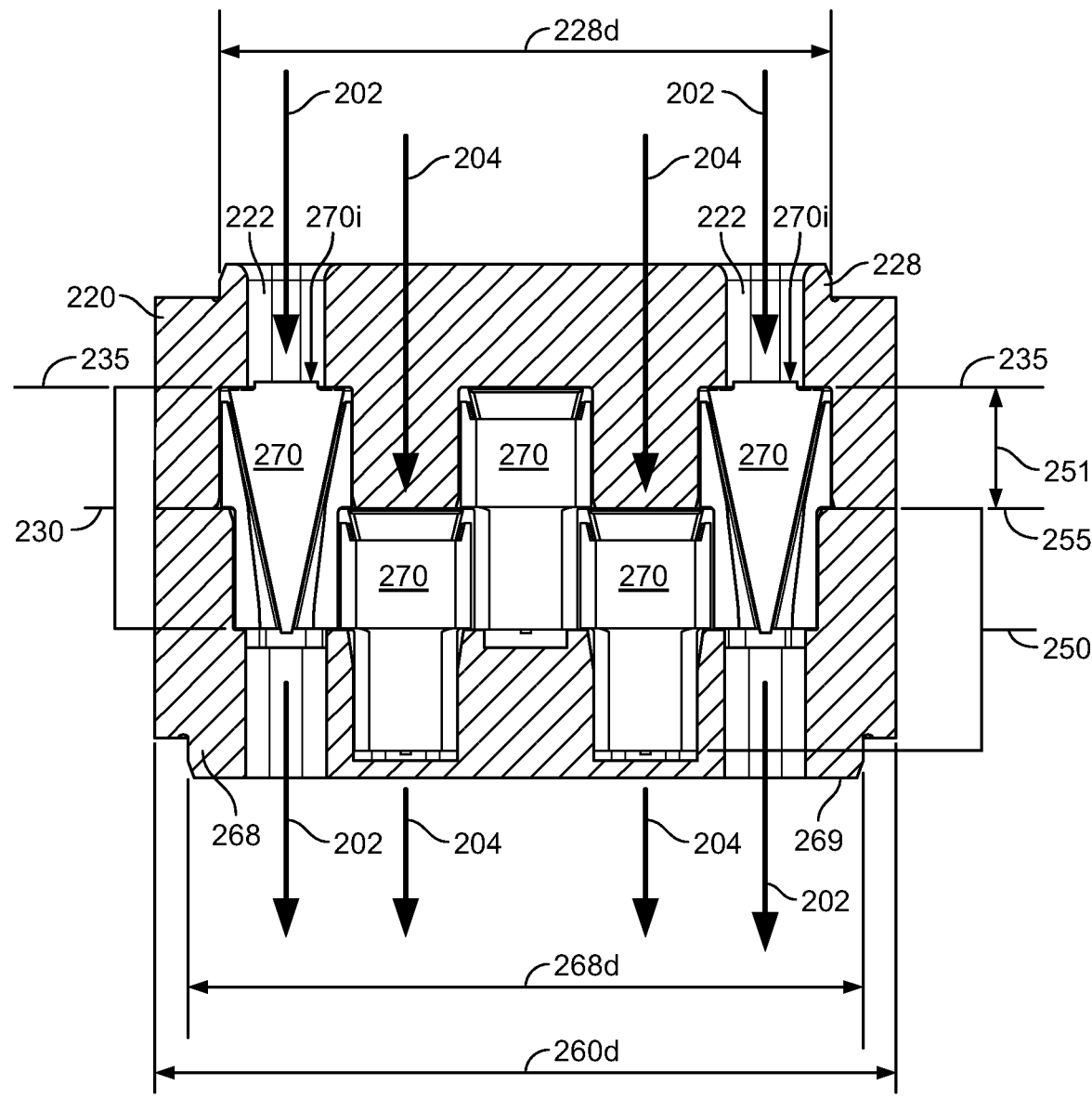
FIG. 23 is a cross-sectional front view of the stacked valve assembly depicted in FIG. 18 when viewed along the section line "23-23" of FIG. 18.
Figure 23A:
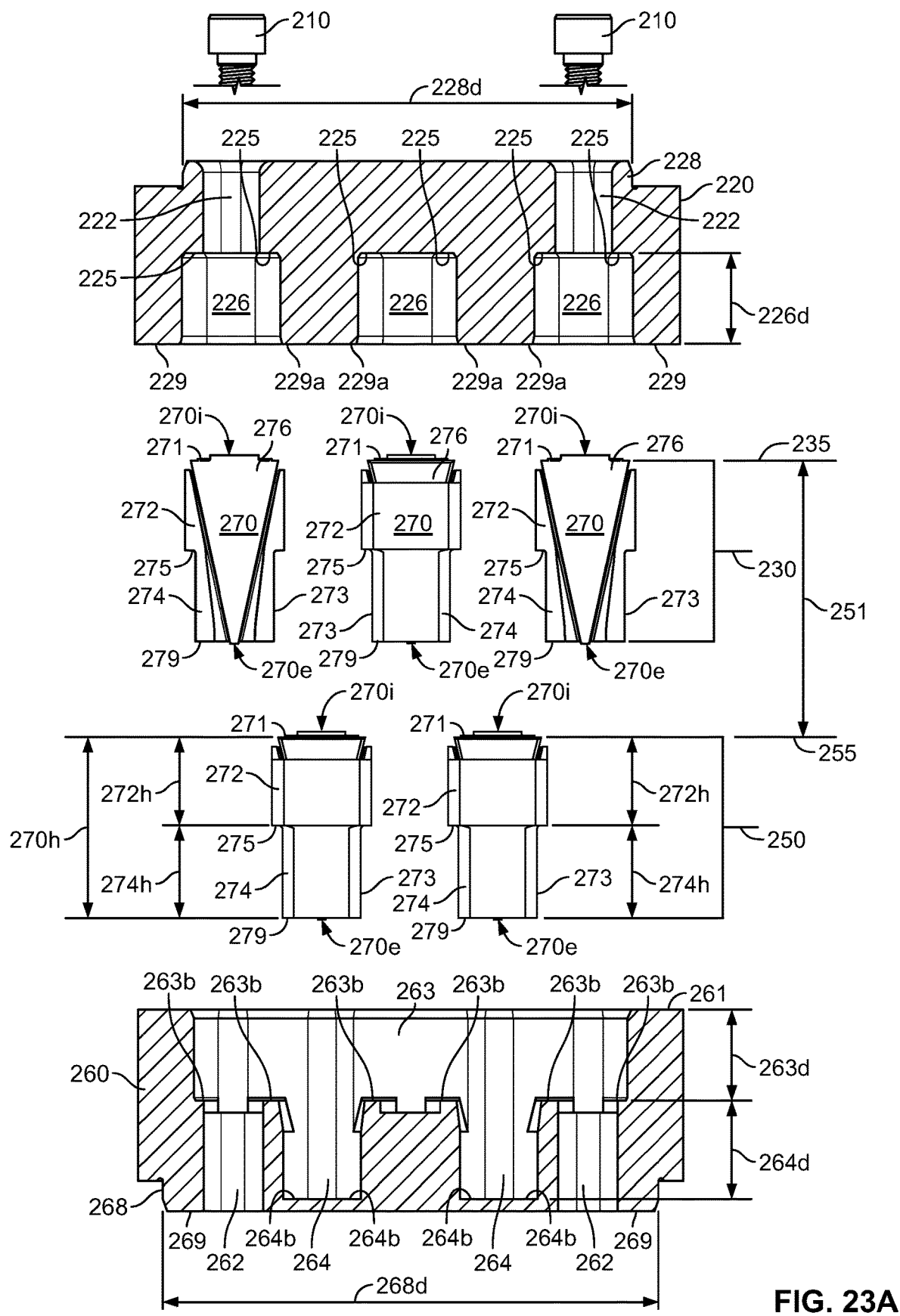
FIG. 23A is an exploded cross-sectional front view of the exemplary stacked valve assembly shown in FIG. 23.
Figure 24:
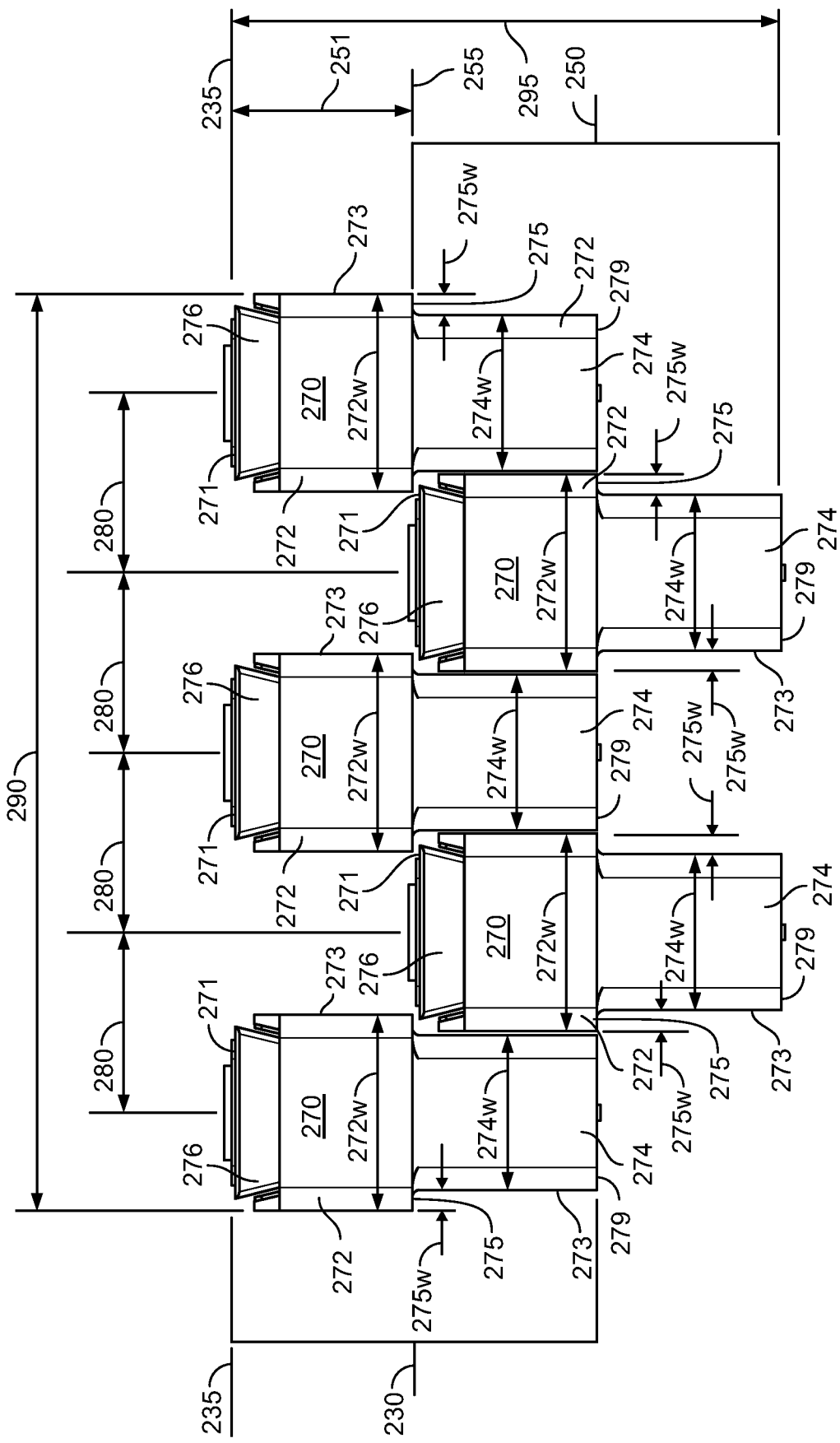
FIG. 24 is a partial cross-sectional front view of the exemplary stacked valve module assembly shown in FIGS. 17-24 when viewed along the section line "24-24" of FIG. 17, showing a plurality of stacked and "nested" reed valve modules.

Turning now to the stacked valve assembly 200 illustrated in FIGS. 17-24, FIG. 17 depicts an isometric view of an illustrative embodiment of the stacked valve assembly 200, and FIGS. 18 and 18A are cross-sectional and exploded cross-sectional isometric views, respectively, of the stacked valve assembly 200 shown in FIG. 17 when viewed along the section line "18-18" of FIG. 17. Additionally, FIGS. 19 and 20 are close-up cross-sectional isometric views of a seat plate 220 and a carrier plate 260 of the stacked valve assembly 200 shown in FIG. 18, and FIGS. 21 and 22 are close-up cross-sectional isometric views of the seat plate 220 and the carrier plate 260 of the stacked valve assembly shown in FIG. 18 when viewed from below. In addition, FIGS. 23 and 23A are cross-sectional and exploded cross-sectional front views, respectively, of the stacked valve assembly 200 shown in FIG. 17 when viewed along the section line "23-23" of FIG. 17, and FIG. 24 is a partial front cross-sectional view of the assembly 200 shown in FIG. 17 when viewed along the section line "24-24" of FIG. 17 but showing only the installed reed valve modules 270, illustrating how the modules 270 may be stacked and "nested" so as to increase the effective flow area of the assembly 200.

As will be noted by a comparison of the stacked valve assembly 200 of FIGS. 17-24 to the stacked valve assembly 100 depicted in FIGS. 1-15, several details and elements are common to both of the assembly 200 and the assembly 100. Accordingly, such details and elements of the stacked valve assembly 200 may be denoted in the following description and attached FIGS. 17-24 by reference numbers that are similar to the reference numbers used to denote corresponding or related details and elements of the stacked valve assembly 100, wherein however the leading numeral "1" used for the reference numbers in FIGS. 1-15 has been replaced by a leading numeral "2" so as to indicate that such reference numbers refer to an element of the assembly 200. For example, the seat plate "220," the carrier plate "260," and the reed valve modules "270" of the stacked valve assembly "200" substantially correspond to the seat plate "120," the carrier plate "160," and the reed valve modules "170" of the stacked valve assembly "100," etc. Furthermore, some details and elements of the stacked valve assembly 200 may be substantially similar to, substantially identical to, or functionally similar to a corresponding detail or element of the stacked valve assembly 100. In such cases, and unless otherwise necessary to convey the details of certain aspects of a particular element of the assembly 200 that may be different from a corresponding or related element of the assembly 100, certain details or elements may not be fully described or mentioned in the description of FIGS. 17-24 below, even though the reference numbers for these corresponding related elements may be noted in one or more of FIGS. 17-24.

With reference to FIGS. 17-23, the exemplary stacked valve assembly 200 may include a seat plate 220, a carrier plate 260, and a plurality of reed valve modules 270 that are arranged in a stacked and "nested" configuration and held in place within the assembly 200 between the seat plate 220 and the carrier plate 260. In certain embodiments, the reed valve modules 270 may be held in place within the stacked valve assembly 200 by securing the seat plate 220 directly to the carrier plate 260 using a plurality of fasteners 210, such as threaded fasteners and the like, although it should be understood that other means may also be used to maintain the reed valve modules 270 in place within the assembly 200, such as is described above with respect to the stacked valve assembly 100.

As can be seen in the depicted embodiment, the stacked valve assembly 200 is configured in a similar fashion to the stacked valve assembly 100 shown in FIGS. 1-11, wherein however an intermediate seat plate, such as the intermediate seat plate 140 of the assembly 100, is not used in the assembly 200. Instead, at least a portion of the bottom surface 229 of the seat plate 220 is brought into direct contact with at least a portion of the top surface 261 of the carrier plate 260 when the stacked valve assembly 200 is in the assembled configuration. Furthermore, the elimination of an intermediate seat plate from the stacked valve assembly 200 may result in the assembly 200 having a reduced clearance volume relative to that of the stacked assembly 100, and which may be approximately proportional to the thickness 140$t$ of the intermediate seat plate 140 of the assembly 100. However, as will be appreciated by those of ordinary skill after a complete reading of the present disclosure, the elimination of an intermediate seat plate from the stacked valve assembly 200 does not affect the previously described beneficial aspects of the stacked and "nested" arrangement of reed valve modules 270 within the assembly 200. Instead, the new and unique stacked and "nested" arrangement of reed valve modules described herein is accomplished by each of the various disclosed embodiments of the stacked valve assemblies, and as is described in particular for the stacked valve assembly 200 with respect to the module arrangement shown in FIG. 24.

It should be understood that the configuration of any one or more of the reed valve modules 270 depicted in FIGS. 17-23 and discussed further below may be in accordance with any of the various embodiments described with respect to the reed valve modules 170 of the stacked valve assembly 100 described above. As such, additional aspects of the reed valve modules 270 will not be discussed in any further detail below except as may be required to provide clarity and distinction where necessary to the various arrangements and embodiments of the stacked valve assembly 200 described herein.

In particular embodiments, the seat plate 220 and the carrier plate 260 may have the same outside diameter 260$d$, although in other embodiments the seat plate 220 and the carrier plate 260 may have different diameters depending on the particular application and/or mounting requirements of the assembly 200. Additionally, one or both of the seat plate 220 and the carrier plate 260 may include a nose having a reduced diameter 228$d$ or 268$d$, respectively, which is smaller than the outside diameter 260$d$ of the stacked valve assembly 200. In those embodiments where both ends of the stacked valve assembly 200 include a nose, such as the nose 228 and/or the nose 268 of the seat plate 220 and carrier plate 260, respectively, the nose diameters 228$d$ and 268$d$ may be the same or different, depending on the particular application.

In the embodiments of the stacked valve assembly 200 depicted in FIGS. 17-23, the second plurality of reed valve modules 270 in the second (lower) level 250 are positioned within and supported by the carrier plate 260 in substantially similar fashion to the corresponding elements of the stacked valve assembly 100 shown in FIGS. 1-11 and described above. That is, wherein each second level reed valve module 270 is substantially completely contained within the upper cavity region 263 and the second cavities 264 of the carrier plate 260 when the stacked valve assembly 200 is in the fully assembled configuration, and is supported by an intermediate support surface 275 on each module 270 through direct contact with portions of the bottom surface 263$b$ of the upper cavity region 263. In the depicted embodiments the depth 264$d$ of each second cavity 264 is greater than the height 274$h$ of the second (lower) portion 274 the respective second reed valve modules 270, thus maintaining a gap between the bottom surface 264$b$ of each second cavity 264 and the bottom surface 279 of each second level reed valve module 270 when the stacked valve assembly 200 is in the assembled configuration.

As noted previously, when the stacked valve assembly 200 is assembled, the bottom surface 229 of the seat plate 220 is brought into contact with the top surface 261 of the carrier plate 260. In the depicted embodiments, lower seating surface portions 229$a$ on the bottom surface 229 of the seat plate 220 in the areas surrounding each of the second flow passages 224 capture the upper seating faces 270 of each of the second plurality of reed valve modules 270. See, FIGS. 19, 21, and 23A. As with the assembled stacked valve assembly 100, the upper seating face 271 of each of the second level reed valve modules 270 is configured to substantially completely surround a respective second flow passage 224, and may be brought into mating or contacting engagement with a respective one of the lower seating surface portions 229$a$ on the bottom surface 229 of the seat plate 220. In this configuration, substantially all of the fluid flow 204 through each second flow passage 224 is thereby directed through a respective module 270, thus substantially preventing the bypass or leakage of any portion of the fluid flow 204 around the second level 250 of modules 270. Furthermore, the depth 263$d$ of the upper cavity region 263 is established as with respect to the stacked valve assembly 100 of FIGS. 1-11 so as to maintain the proper spatial relationship between first portion 272 of each second level reed valve module 270 and the capturing surfaces 229$a$ and 263$b$. Additionally, the seating faces 271 surrounding the flow inlets 270$i$ of each of the second level reed valve modules 270 will be substantially co-planar with a second plane 255 that in turn is co-planar with the lower seating surface portions 229$a$ on the seat plate 220.

With reference to FIGS. 18-23 in particular, when the stacked valve assembly 200 is in the assembled configuration, the first plurality of reed valve modules 270 in the first level 230 are positioned within the seat plate 220 in substantially similar fashion to the corresponding elements of the stacked valve assembly 100 shown in FIGS. 1-11 and described above. That is, the first (upper) portion of each reed valve module 270 in the first level 230 is substantially completely contained or housed within a respective one of the first cavities 226, and the seating face 271 on each second level reed valve module 270 is captured by and brought into contacting or mating engagement with the upper searing surfaces 225 on the seat plate 220. Additionally, in the depicted embodiments the upper seating faces 271 of the first level reed valve modules 270 are each substantially co-planar with a first plane 235 that is substantially parallel to the bottom surface 229 of the seat plate 220. Furthermore, the first plane 235 is vertically offset above the top surface 261 of the carrier plate 260 and the bottom surface 229 of the seat plate, both of which are co-planar with the second plane 255 in the assembled configuration, by a distance 251 that is substantially the same as the depth 226$d$ of the first cavities 226, and may also be substantially co-planar with the upper seating surfaces 225 on the seating plate 220 (see, FIGS. 19, 21, and 23A).

In the depicted embodiments of the stacked valve assembly 200, each of the first level reed valve modules 270 is supported by the bottom surface 279 of a module 270 through direct contact with portions of the bottom surface 263b of the upper cavity region 263. In order for each first level reed valve module 270 to be supported in this manner, and for the seating face 271 of each module 270 to be in proper contacting or mating engagement with a respective upper seating surface 225, the depth 226d of each first cavity 226 should be at least equal to, and preferably greater than, the height 272h of the first portion of the reed valve module 270 contained within the cavity 226. Such a cavity depth 226d guards against the intermediate support surface 275 on any of the first level reed valve modules 270 from coming into contact with any portion of the upper surface 261 of the carrier plate 260 that surrounds the upper cavity region 263 in a way that might affect support of the modules 270 from the bottom surfaces 279. Additionally, the combined depths 226d and 264d of each respective aligned group of first and second cavities 226/264 should be substantially equal to the overall module height 270h of each first level reed valve module 270 (see, FIG. 23A), which thereby allows the seating faces 271 on the first level 230 of reed valve modules 270 to properly seat against the corresponding upper seating surfaces 225 on the seat plate 220, while also allowing the first level modules 270 to be supported by way of contact with the bottom surface of each module 270 with corresponding portions of the bottom surface 263b of the upper cavity region 263 at least on opposing sides of a respective flow outlet passage 262.

In an alternative illustrative embodiment of the stacked valve assembly 200, the second level modules 270 may be supported by way of the bottom surface 279 of the modules 270 in similar fashion to the way the first level reed valve modules 270 are supported from portions of the bottom surfaces 263b of the upper cavity region 263, rather than using the intermediate support surfaces 275. In such embodiments, the depth 263d of the upper cavity region 263 and the combined depths 263d and 264d of the upper cavity region 263 and the respective second cavities 264 should adjusted in a similar manner to what has been described above with respect to supporting the first plurality of reed valve modules 270 in the first level 230. In particular, the depths 263d and 264d can be adjusted so that the intermediate support surfaces 275 of the second level reed valve modules 270 do not interfere with the proper positioning and seating of the second level modules 270 between the lower seating surface portions 229a on the bottom surface of the seat plate and the bottom surfaces 264b of the second cavities 264.

FIG. 24 is a partial cross-sectional front view of the exemplary stacked valve module assembly shown in FIGS. 17-24 when viewed along the section line "24-24" of FIG. 17, wherein only the first and second pluralities of stacked and "nested" reed valve modules 270 are shown for clarity. Generally, the "nested" arrangement of the first and second pluralities of reed valve modules 270 in the first and second levels 230/250 of the stacked valve assembly 200 is substantially the same as is described with respect to the stacked and "nested" arrangement of reed valve modules 170 of the stacked valve assembly 100 as shown in FIGS. 14 and 15 and described above. Accordingly, when the first and second reed valve assemblies are of the same nominal size and for a same application, and the quantity and size of reed valve modules 270 installed in the stacked valve assembly 200 are the same as the quantity and size of reed valve modules 170 installed in the stacked valve assembly 100, then the center-to-center lateral spacing distance 280 of the modules 270 in the assembly 200 would be the same as the center-to-center lateral spacing distance 180 of the modules 170 in the assembly 100, and the overall lateral grouping width 290 of the modules 270 would be the same as the overall lateral grouping width 190 of the modules 170.

However, under the same valve size and module size and quantity constraints noted above, the overall stack height 295 of the reed valve modules 270 in the stacked valve assembly 200 would typically be less than the overall stack height 195 of the reed valve modules 170 in the stacked valve assembly 100 due to the elimination of an intermediate seat plate in the stacked valve assembly 200. Furthermore, this difference may result in a reduced clearance volume in the assembly 200 as compared to that of the assembly 100. For example, depending on the arrangement parameters of the reed valve modules 270, such as how and where they are supported in the stacked valve assembly 200, the overall stack height 295 may be substantially equal to a height that is as small as the combined height 272h of the first (upper) portions 272 of the first level modules 270 and the overall module height 270h of the second level modules 270.

It should be understood by one of ordinary skill after a complete reading of the present disclosure that a stacked valve assembly in accordance with any one of the described embodiments herein is adapted to contain a plurality of valve modules, such as the reed valve modules 170 or 270, in an arrangement as is shown in any of the FIG. 14, 15, or 24 between a valve seat, such as the seat plate 120 or 220, that is configured to support the pressure load on the valve (which is cyclic, in the case of a compressor valve) and a retainer, such as the carrier plate 160 or 260, that is configured to hold the valve modules in place against the valve seat. These functions can be accomplished in a variety of different ways while maintaining the disclosed stacked and "nested" arrangement of the valve modules, such as by splitting the valve seat and/or the retainer into multiple parallel plates. For example, a two-plate combination such as the seat plate 120 and the intermediate seat plate 140 of the stacked valve assembly 100 may be used, wherein a carrier plate 160 holds one or more valve modules in place against the intermediate seat plate 140 and holds the intermediate seat plate 140 against the seat plate 120, and the intermediate seat plate 120 in turn holds one or more valve modules in place against the seat plate 120. Furthermore, any suitable combination of three or more plates may also be used within the scope of the present disclosure. Additionally, the cavities that house or contain the valve modules, such as the cavities 126/226, 163/263, or 164/264, may also be distributed in any suitable way between the various plates of the stacked valve assembly, again while maintaining the disclosed stacked and "nested" arrangement of the valve modules. It should also be understood that, as with a typical or standard valve, the valve seat or the retainer may be made integral to a mechanical device, such as a compressor cylinder, a pipeline check valve, an engine intake, and the like, without affecting the efficiencies provided by the stacked and "nested" valve module arrangements disclosed herein.

As a result, the subject matter disclosed herein provides detailed aspects of various stacked valve assemblies having an improved effective flow area ratio. In certain embodiments, the stacked valve assemblies may include first and second levels of valve modules that are arranged around a seat plate, wherein the first and second levels of valve modules are vertically offset from each other and at least one of the first and second levels of valve modules is vertically offset relative to the seat plate. Additionally, in at least some embodiments, at least a portion of some of the valve modules in the first level are laterally "nested" adjacent to at least a portion of some of the valve modules in the second level, thus enabling a closer spacing between adjacent reed valve modules and a tighter overall packing density of valve modules within the stacked valve assembly.

The particular embodiments disclosed above are illustrative only, as the subject matter defined by the appended claims may be modified and practiced in different but equivalent manners apparent to those skilled in the art having the benefit of the teachings herein. For example, some or all of the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the claimed subject matter. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes or structures may or may not be required. Accordingly, the protection sought herein is as set forth in the claims below.

What is claimed:

1. A method of arranging valve modules in a valve assembly, the method comprising:
    arranging a plurality of first valve modules in a first level within said valve assembly such that a first seating face of each of said plurality of first valve modules is co-planar with a first plane; and
    arranging a plurality of second valve modules within said valve assembly such that a second seating face of each of said second valve modules is co-planar with a second plane, wherein said second plane is offset from said first plane by a first distance,
    wherein arranging said plurality of second valve modules within said valve assembly comprises positioning each of said plurality of second valve modules between an adjacent pair of said plurality of first valve modules so that a portion of each opposing side of each of said second plurality of valve modules is positioned proximate a portion of a side of one of said adjacent pair of said plurality of first valve modules.

2. The method of claim 1, wherein each of said plurality of first valve modules comprises an upper portion having an upper lateral width and a lower portion having a lower lateral width that is less than said upper lateral width, and wherein arranging said plurality of second valve modules within said valve assembly further comprises positioning each of said plurality of second valve modules between an adjacent pair of said plurality of first valve modules so that a part of said upper portion of each of said adjacent pair of said plurality of first valve modules overhangs and is positioned partially above one of said plurality of second valve modules.

3. A valve assembly, comprising:
    a seat plate having a top surface and a bottom surface;
    a carrier plate coupled to said seat plate, said carrier plate having a top surface and a bottom surface, wherein said top surface of said carrier plate is positioned below said bottom surface of said seat plate;
    a plurality of first valve modules each including a module body having sealing surfaces thereon, a plurality of reed petals each sealing against a respective one of the sealing surfaces when in the closed position, and a module housing, wherein a flow inlet of each of said plurality of first valve modules is arranged in a first level relative to said seat plate; and
    at least one second valve module including a module body having sealing surfaces thereon, a plurality of reed petals each sealing against a respective one of the sealing surfaces of said at least one second valve module when in the closed position, and a module housing, wherein a flow inlet of said at least one second valve module is arranged in a second level relative to said seat plate, wherein said second level is offset from said first level by a distance,
    wherein each of said plurality of first valve modules comprises a first portion having a first lateral width and a second portion having a second lateral width that is less than said first lateral width, said second portion being positioned below said first portion,
    wherein at least a first part of said first portion of each of said plurality of first valve modules at a first side of said first portion is offset from and overhangs a corresponding first side of said second portion, and
    wherein said overhanging first part of said first portion of a first one of said plurality of first valve modules is positioned above at least part of said at least one second valve module.

4. The valve assembly of claim 3, further comprising an intermediate seat plate positioned between said carrier plate and said seat plate, wherein said second portion of each of said plurality of first valve modules extends through a respective opening in said intermediate seat plate and into said carrier plate.

5. The valve assembly of claim 4, wherein a first seating face of each of said plurality of first valve modules is in contacting engagement with an upper seating surface on said seat plate and a second seating face of said at least one second valve module is in contacting engagement with a lower seating surface on said intermediate seat plate.

6. A valve assembly, comprising:
    a seat plate having a top surface and a bottom surface;
    a plurality of first valve modules arranged in a first level relative to said seat plate such that a first seating face of each of said plurality of first valve modules is co-planar with a first plane; and
    at least one second valve module arranged in a second level relative to said seat plate such that a second seating face of said at least one second valve module is co-planar with a second plane, wherein said second plane is offset from said first plane by a first distance,
    wherein each of said plurality of first valve modules comprises a first portion having a first lateral width and a second portion having a second lateral width that is less than said first lateral width, said second portion being positioned below said first portion, wherein at least a first part of said first portion of each of said plurality of first valve modules at a first side of said first portion is offset from and overhangs a corresponding first side of said second portion,
    wherein said second portion of at least a first one of said plurality of first valve modules is positioned relative to said at least one second valve module such that said first side of said second portion of said first one of said first plurality of valve modules is positioned proximate a second side of said at least one second valve module and said overhanging first part of said first portion of said first one of said plurality of first valve modules is positioned above at least part of said at least one second valve module, wherein said seat plate comprises one or more cavities, said first portion of each one of said plurality of first valve modules being completely contained within a respective one of said one or more cavities, and said second portion of said each one of said plurality of first valve modules extending out of said respective one of said one or more cavities through said bottom surface of said seat plate.

7. The valve assembly of claim 6, wherein said at least one second valve module is positioned entirely below said bottom surface of said seat plate.

8. The valve assembly of claim 7, further comprising a carrier plate coupled to said seat plate, said carrier plate having a top surface and a bottom surface and comprising an upper cavity region, wherein said at least one second valve module is completely contained within said upper cavity region.

9. The valve assembly of claim 8, wherein said plurality of first valve modules and said at least one second valve module are supported in said valve assembly from a bottom surface of said upper cavity region in said carrier plate.

10. A valve assembly, comprising:
a seat plate having a top surface and a bottom surface;
a plurality of first valve modules arranged in a first level relative to said seat plate such that a first seating face of each of said plurality of first valve modules is co-planar with a first plane;
at least one second valve module arranged in a second level relative to said seat plate such that a second seating face of said at least one second valve module is co-planar with a second plane, wherein said second plane is offset from said first plane by a first distance,
wherein each of said plurality of first valve modules comprises a first portion having a first lateral width and a second portion having a second lateral width that is less than said first lateral width, said second portion being positioned below said first portion, wherein at least a first part of said first portion of each of said plurality of first valve modules at a first side of said first portion is offset from and overhangs a corresponding first side of said second portion,
wherein said at least one second valve module is positioned entirely below said bottom surface of said seat plate,
wherein said seat plate comprises one or more cavities, said first portion of each one of said plurality of first valve modules being completely contained within a respective one of said one or more cavities, and said second portion of each of said plurality of first valve modules extending out of said respective one of said one or more cavities through said bottom surface of said seat plate; and
a carrier plate coupled to said seat plate, said carrier plate having a top surface and a bottom surface and comprising an upper cavity region, wherein said at least one second valve module is completely contained within said upper cavity region,
wherein said second portion of each of said plurality of first valve modules is at least partially contained within said upper cavity region in said carrier plate.

11. The valve assembly of claim 10, wherein each of said first seating face of each of said plurality of first valve modules is in contacting engagement with an upper seating surface on said seat plate and said second seating face of said at least one second valve module is in contacting engagement with a lower seating surface on said seat plate.

12. The valve assembly of claim 10, wherein said top surface of said carrier plate directly contacts said bottom surface of said seat plate.

13. The valve assembly of claim 10, further comprising an intermediate seat plate positioned between said carrier plate and said seat plate, wherein said second portion of each of said plurality of first valve modules extends through a respective opening in said intermediate seat plate and into said upper cavity region in said carrier plate.

14. The valve assembly of claim 13, wherein said plurality of first valve modules are supported in said valve assembly from a top surface of said intermediate seat plate.

15. The valve assembly of claim 13, wherein said first seating face of each of said plurality of first valve modules is in contacting engagement with an upper seating surface on said seat plate and said second seating face of said at least one second valve module is in contacting engagement with a lower seating surface on said intermediate seat plate.

* * * * *